US005410350A

United States Patent [19]

Kato et al.

[11] Patent Number: 5,410,350

[45] Date of Patent: Apr. 25, 1995

[54] MOTION PICTURE ENCODING AND/OR DECODING SYSTEM

[75] Inventors: Motoki Kato; Yoichi Yagasaki; Jun Yonemitsu, all of Kanagawa, Japan

[73] Assignee: Sony Corporation, Tokyo, Japan

[21] Appl. No.: 5,311

[22] Filed: Jan. 15, 1993

[30] Foreign Application Priority Data

Oct. 28, 1992 [JP] Japan .................................. 4-290462

[51] Int. Cl.$^{6}$ .................................................. H04N 7/50

[52] U.S. Cl. ...................................... 348/400; 348/401; 348/421

[58] Field of Search ............... 348/400, 401, 402, 420, 348/421; H04N 7/133, 7/137

[56] References Cited

U.S. PATENT DOCUMENTS 5,260,783 11/1993 Dixit .................................... 348/401

*Primary Examiner*—Howard W. Britton

*Attorney, Agent, or Firm*—William S. Frommer; Alvin Sinderbrand

[57] ABSTRACT

A motion picture coding and decoding system is provided, which permits high picture quality to be obtained with less information amount than that in case of a system having the sole function of DCT coding, permits reduction of block distortion of reproduced picture and permits coding efficiency increase. One picture frame is divided into a plurality of blocks for block-by-block coding. At this time, discrete cosine transform (DCT) coding and intra-block non-transform coding (NTC) are adaptively switched one over to the other according to the character of pattern. In case of the intra-block non-transform coding, predictive values of block and quantizing width are transmitted. Each block is adaptively selected with sub block of frame construction or sub block of field construction.

24 Claims, 31 Drawing Sheets

K1

| | | | | | | | |
|---|---|---|---|---|---|---|---|
| 100 | 90 | 80 | 70 | 60 | 50 | 40 | 30 |
| 90 | 80 | 70 | 60 | 50 | 40 | 30 | 40 |
| 80 | 70 | 60 | 50 | 40 | 30 | 40 | 50 |
| 70 | 60 | 50 | 40 | 30 | 40 | 50 | 60 |
| 60 | 50 | 40 | 30 | 40 | 50 | 60 | 70 |
| 50 | 40 | 30 | 40 | 50 | 60 | 70 | 80 |
| 40 | 30 | 40 | 50 | 60 | 70 | 80 | 90 |
| 30 | 40 | 50 | 60 | 70 | 80 | 90 | 100 |

⇩
DCT
⇩

K2

| | | | | | | | |
|---|---|---|---|---|---|---|---|
| 450 | 0 | 45 | 0 | 10 | 0 | 3 | 0 |
| 0 | 131 | 0 | 0 | 0 | 0 | 0 | 0 |
| 45 | 0 | -34 | 0 | 0 | 0 | 0 | 0 |
| 0 | 0 | 0 | 16 | 0 | 0 | 0 | 0 |
| 10 | 0 | 0 | 0 | -10 | 0 | 0 | 0 |
| 0 | 0 | 0 | 0 | 0 | 7 | 0 | 0 |
| 3 | 0 | 0 | 0 | 0 | 0 | -6 | 0 |
| 0 | 0 | 0 | 0 | 0 | 0 | 0 | 5 |

⇩
QUANTIZING
⇩

K3

| | | | | | | | |
|---|---|---|---|---|---|---|---|
| 45 | 0 | 4 | 0 | 0 | 0 | 0 | 0 |
| 0 | 13 | 0 | 0 | 0 | 0 | 0 | 0 |
| 4 | 0 | -3 | 0 | 0 | 0 | 0 | 0 |
| 0 | 0 | 0 | 1 | 0 | 0 | 0 | 0 |
| 0 | 0 | 0 | 0 | -1 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |

⇨

| | | | | | | | |
|---|---|---|---|---|---|---|---|
| 0 | 1 | 5 | 6 | 14 | 15 | 27 | 28 |
| 2 | 4 | 7 | 13 | 16 | 26 | 29 | 42 |
| 3 | 8 | 12 | 17 | 25 | 30 | 41 | 43 |
| 9 | 11 | 18 | 24 | 31 | 40 | 44 | 53 |
| 10 | 19 | 23 | 32 | 39 | 45 | 52 | 54 |
| 20 | 22 | 33 | 38 | 46 | 51 | 55 | 60 |
| 21 | 34 | 37 | 47 | 50 | 56 | 59 | 61 |
| 35 | 36 | 48 | 49 | 57 | 58 | 62 | 63 |

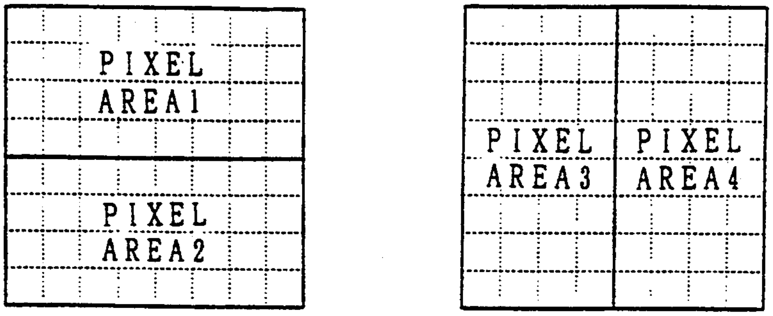

DATA SCAN PATH selector calculates the following variables.
Variable sum_abs_event[0] is the summation of absolute quantized pixels in PIXES_AREA1.
And sum_abs_event[1]sum_abs_event[2], and sum_abs_event[3] are the summation of absolute quantized pixels in PIXEL_AREA2, PIXEL_AREA3, and PIXEL_AREA4 respectively.

```
max=0;
for(n=0;n<4;n++)
  if(sum_abs_event[n]>max).
    max=sum_abs_event[n];
    concentrate_event_area=n;
  }
}
if(concentrate_event_area==0)
  DATA SCAN PATH is No,1.
else if(concentrate_even_area==1)
  DATA SCAN PATH is No,2.
else if(concentrate_even_area==2)
  DATA SCAN PATH is No,3.
else if(concentrate_even_area==3)
  DATA SCAN PATH is No,4.
```

(b)definition of selection of data path.

FIG. 15

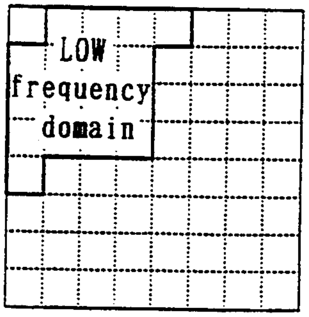

8x8 block dct coeficients.
(a)definition of LOW FREQUENCY DOMA IN.

```
#define BLOCKSIZE 64
int coef[64]; /* dct coefficients of the current coding block. */
int MASK[64]={0,1,1,1,1,0,0,0,
              1,1,1,1,0,0,0,0,
              1,1,1,1,0,0,0,0,
              1,1,1,1,0,0,0,0,
              1,0,0,0,0,0,0,0,
              0,0,0,0,0,0,0,0,
              0,0,0,0,0,0,0,0,
              0,0,0,0,0,0,0,0,};

for(i=0;i<BLOCKSIZE;i++){
   low[i]=coef[i]*MASK[i];
}
for(i=1;i<BLOCKSIZE;i++)
   low_ac_power+=low[i]*low[i];
   all_ac_power+=coef[i]*coef[i];
}

if(low_ac_power/17≦LITTLE AC THRESHOLD ||
   low_ac_power/all_ac_power≦AC_CONCENTRATE_THRESHOLD)
    return(apply_DCT);
}

※ LITTLE_AC_THRESHOLD=64;
   AC_CONCENTRATE_THRESHOLD=0.95;
   these vallues under study.
```

FIG. 21

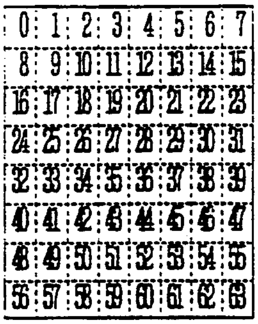
8x8 block pixels.
x[64]=[x0....x63]:
FIG. 22A
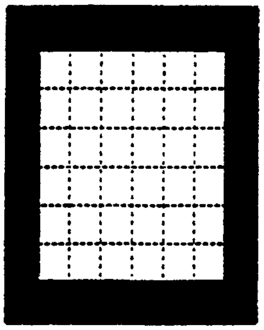
:area of pixels for estimation of base.
FIG. 22B
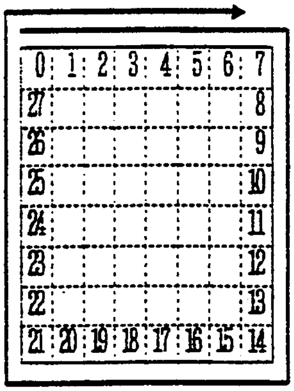
pixel order in area
FIG. 22C
pick out pixels in area accoding to the order shown in Figure(c).
t[35]=[x0, x1, x2, x3, x4, x5, x6, x7, x15, x23, x31, x39, x47, x55, x63,
x62, x61, x60, x59, x58, x57, x56, x48, x40, x32, x24, x16,
x8, x0, x1, x2, x3, x4, x5, x6]:
pixels for estimation of base.
FIG. 22D

The case of base1 i = No.25

■ : area of pixels using calculation of base1=mean[25].

□ : area of pixels using selection of base2.

i.e. base2 is selected from {mean[i]: $8 \leq i \leq 14$}.

```
#define  N_PIXEL_oneAREA 8
#define  N_AREA 28
#define  N_DIFF_oneAREA 7 /*(N_PIXEL_oneAREA-1)*/
#define  N_SELECT_PIXEL 35

int  abs_diff[N_SELECT_PIXEL-1];
int  mean[N_AREA*2],sum_abs_diff[N_AREA*2];

/*-----------------------------------
   calculation mean[], sum_abs_diff[]
  -----------------------------------*/
for(i=0;i<N_SELECT_PIXEL-1;i++){
   abs_diff[i]=abs(t[i+1]-t[i]);
}

for(i=0;i<N_DIFF_oneAREA;i++){
  diff_buff += abs_diff[i];
}

sum_abs_diff[0]=diff_buff;

for(i=0;i<N_PIXEL_oneAREA;i++){
  sum_buff += t[i];
}
mean[0]= (double)sum_buff/N_PIXEL_oneAREA;

for(i=1;i<N_AREA;i++){
  diff_buff=diff_buff-abs_diff[i-1]+abs_diff[i+N_DIFF_oneAREA-1];
  sum_abs_diff[i]=diff_buff;

  sum_buff =sum_buff-t[i-1]+t[i+N_PIXEL_oneAREA-1];
  mean[i]= (double)sum_buff/N_PIXEL_oneAREA;
}

/*--------------------
   APPEND data
  --------------------*/
for(i=N_AREA;i<N_AREA*2;i++){
  mean[i]   =mean[i-N_AREA];
  sum_abs_diff[i]=sum_abs_diff[i-N_AREA];
}
```

FIG. 24

```
/*--------------------
   search BASE1
  --------------------*/
mintmp=9999;
 for(i=0;i<N_AREA;i++){
   if(sum_abs_diff[i]<mintmp){
     mintmp=sum_abs_diff[i];
     base1_i=i;
   }
}
base1=mean[base1_i];
sum_abs_diff1 =sum_abs_diff[base1_i];

/*--------------------
   search BASE2
  --------------------*/
START_ADDRESS_SEARCH_BASE2 =base1_i+11;
END_ADDRESS_SEARCH BASE2   =START_ADDRESS_SEARCH_BASE2+6;

mintmp=99999;
for(i=START_ADDRESS_SEARCH_BASE2;
    i<END_ADDRESS_SEARCH_BASE2+1;
    i++){
  if(sum_abs_diff[i]<mintmp){
     mintmp=sum_abs_diff[i];
     base2_i=1;
   }
}
base2=mean[base2_i];
sum_abs_diff2 =sum_abs_diff[base2_i];
```

FIG. 25

```
/*--------------------
   get peak
  --------------------*/
if (base1-min >max-base1){
  peak=base1-min;}
else{
  peak=max-base1;}

/*----------------------------
   Is peak BIG or not??
  ----------------------------*/
if(peak<PEAK_THRESHOLD)
  return(APPLY_DCT); /*--not Edge block--*/


/*----------------------------
   Is base1 VALID or not??
  ----------------------------*/
if(sum_abs_diff1 > FLAT_SAD_THRESHOLD){
  return(APPLY_DCT);
  /*--because BASE1 is INVALID--*/
}

/*------------------------------
   Is base2 VALID or not??
   Is base1 nearly equal base2??
  ------------------------------*/
if((sum_abs_diff2 > FLAT_SAD_THRESHOLD) ||
   (abs(base1-base2) <= DIFF_BASE_THRESHOLD)){
  base2_valid_or_not=BASE_INVALID;
}
else{
  base2_valid_or_not=BASE_VALID;
}

/*----------------------------------------
   if INTRA_CODED_MB and base2 is valid.
   is it possible NTC??
  ----------------------------------------*/
if(NB_MODE_INTRA && base2_valid_or_not=BASE_VALID){
  if(given_q*3 - abs(base1-base2) > BASE_DISTANCE_ERR){
    /* given_q: given quantize scale by rate control */
    return(APPLY_DCT);
  }
}
```

FIG. 26

```
/*---------------------------
   Counting flat area pixels.
  ---------------------------*/
count_base1_pixel=0;
count_base2_pixel=0;
count_flat_area_pixel=0;
count_base1_pixel
    =get_count_flat_area_pixel(X,base1,
                               DIFF_BASE_THRESHOLD);
    /* X[]:pixels of curreat coding block */
count_flat_area_pixel=count_base1_pixel;

if(base2_valid_or_not==BASE_VALID){
  count_base2_pixel
      =get_count_flat_area_pixel(X,base2,
                                 DIFF_BASE_THRESHOLD);
  count_flat_area_pixel+=count_base2_pixel;
}

/*---------------------------
   Is flat area LARGE??
  ---------------------------*/
if(count_flat_area_pixel<COUNT_FLAT_PIXEL_THRESHOLD){
  return(APPLY_DCT);
  /*because flat area is little. */
}
/*-----------------------------
   Does base2 swap for base1??
  -----------------------------*/
if(base2_valid_or_not==BASE_VALID){
  if(count_base1_pixel < count_base2_pixel){
    int  swap;
    swap=base1;
    base1=base2;
    base2=swap;
  }
}
```

FIG. 27

```
/*---------------------------
   if NON_INTRA_CODED_MB,
   base1 must be ZERO.
  ---------------------------*/
if(NON_INTRA_CODED_MB){
  if(abs(base1)>DIFF_BASE_THRESHOLD){
    return(APPLY_DCT);
  }
  else{
    base1=0;
    if (abs(min) > abs(max)){
      peak= abs(min);}
    else{
      peak= abs(max);}
    }
}
/*---------------------------
   COUNT FLAT AREA PIXELS
  ---------------------------*/
int get_count_flat_area_pixel(pixel,base.
                              diff_base_threshold)
    int *pixel;
    int base,diff_base_threshold;
{
  int i, count=0;
  for(i=0;i<64;i++){
    if(abs(pixel[i]-base)<=diff_base_threshold)
      count++;
    }
  }
  return(count);
 }
```

FIG. 28

| MB No.0 | | MB No.1 | |
|---|---|---|---|
| $Y_{00}$ | $Y_{01}$ | $Y_{10}$ | $Y_{11}$ |
| $Y_{02}$ | $Y_{03}$ | $Y_{12}$ | $Y_{13}$ |

...

| MB No.0 | | MB No.1 | |
|---|---|---|---|
| $Y_{00}$ | $Y_{01}$ | $Y_{10}$ | $Y_{11}$ |
| $Y_{02}$ | $Y_{03}$ | $Y_{12}$ | $Y_{13}$ |

...

```
Field/Frame coding decisions

Field Based coding rather than frame based coding
is used if the following equation holds:
if (var__1 < =var__2 + offset)
          Frame based coding
else
          Frame based coding

Offset=4096 for intra MB
Offset=0 for inter MB
Where var__1 and Var__2 are calculated with the
following lines:
var__1 = 0;
var__2 = 0;
for (Pix = 0; Pix < 16; Pix ++) {
    for (Line = 0; Line < 16; Line += 2) {
        Sum = 0 (Pix, Line) - 0 (Pix, Line+1);
        var__1 += (sum * sum);
   }
    for (Line = 0; Line < 16; Line += 4) {
        Sum__1 = 0 (Pix, Line) - 0 (Pix, Line+2);
        Sum__2 = 0 (Pix, Line+1) - 0 (Pix, Line+3);
        var__2 += (sum__1 * sum __1) + (sum__2 * sum __2)
    }
}
Where 0(Pix, Line) denotes a pel of the 16 x 16
macroblock to be transformed.
```

FIG. 33

MOTION PICTURE ENCODING AND/OR DECODING SYSTEM

BACKGROUND OF THE INVENTION

1. Field of The Invention

This invention relates to a motion picture encoding and/or decoding system, and more particularly to a system, which permits transmission of motion picture signal by compressing the same.

2. Description of The Prior Art

As typical motion picture encoding system, there are those of two-dimensional discrete cosine transform (DCT) coding method and predictive coding method.

In the discrete cosine transform (DCT) coding method, signal power is concentrated in predetermined frequency components making use of the fact that picture signal has two-dimensional correlative property. The resultant distribution of signal power frequency components is coded by expressing it with coefficients, and in this way information can be compressed.

For example, with a flat pattern portion, in which the motion picture signal is highly self-correlative, the discrete cosine transform coefficients (DCT coefficients) are distributed such that they are concentrated in low frequency components. Thus, in this case information to be transmitted can be expressed by merely coding the coefficients distributed such as to be concentrated in a low frequency region, thus permitting compression of information.

With the discrete cosine transform method, however, if discontinuous points of such signal as picture signal including contours (or edges) are to be transmitted by accurately expressing them with DCT coefficients, the generated DCT coefficients are distributed broadly from low to high frequency components. Therefore, an extremely large number of coefficients are required, thus reducing the coding efficiency. To solve this problem, a method of coarsening the coefficient quantizing characteristic or discarding high frequency component coefficients has been used for high compression coding motion pictures. These measures, however, are still insufficient in that the motion picture signal is deteriorated pronouncedly. For example, a distortion like a waver (which is called corona effect mosquito noise) is generated around the contour.

The predictive coding method, on the other hand, makes use, for coarsening the quantizing characteristic, of the eye's character that the brightness discrimination degree is low for contour portions of motion picture, and it has an advantage that it permits comparatively high compression coding. In this method, however, coarsening the quantizing characteristic for flat portions of motion picture, is liable to result in visually pronounced deterioration, such as generation of false contours or particle-like noises. Therefore, the predictive coding is not suited as means for high compression coding of flat portions.

Accordingly, it has been contemplated to let the discrete cosine transform (DCT) and predictive coding methods mutually make up for their drawbacks, that is, to switch the discrete cosine transform (DCT) and intra-block discrete cosine transform methods for each unit block according to the character of the pattern for high compression coding. More specifically, it is through that the discrete cosine transform (DCT) method may be used for a flat block of picture, while using the intra-block non-transform coding (NTC) (or intra-block predictive coding) for a contour portion of picture.

In the block-by-block intra-block non-transform coding (NTC), there is a problem of block distortion which is generated when the quantizing is made coarsely. Specifically, this is a mosaic-like phenomenon produced for each block as a result of the coding.

In the intra-block non-transform coding (NTC), quantizing errors generated as a result of coarse quantizing directly appear as brightness level changes (or deterioration). If great brightness level changes appear along the boundary between adjacent blocks, the shape of the blocks is pronounced visually like a mosaic.

SUMMARY OF THE INVENTION

In view of the foregoing, an object of this invention is to provide a motion picture coding and/or decoding system, which permits block-by-block transmission of compression coded data of motion pictures without causing block distortion of decoded motion pictures.

The foregoing objects and other objects of the invention have been achieved by the provision of the motion picture coding and/or decoding apparatus wherein: when coding a frame of motion picture by dividing the frame into a plurality of blocks for block-by-block coding, the discrete cosine transform coding and intra-block non-transform coding are adaptively switched according to the character of the pattern.

The discrete cosine transform (DCT) coding system is used for flat portions of the motion picture. At this time, even by effecting coarse quantizing with the DCT coding method, it is possible to obtain for the decoded motion picture a smoothness corresponding to the accuracy of calculation at the time of the discrete cosine transform. The intra-block non-transform coding (NTC) method is used for contour portions of the motion picture. At this time, for reducing block distortion resulting from coarse quantizing, adaptive quantizing if effected by transmitting data of a typical value BASE1 of block and the quantizing width Q or the typical value BASE1 of block, the difference D between BASE1 and another typical value BASE2 and the quantizing width Q. In the decoding system, picture is decoded by using the typical value BASE 1 of block and quantizing width Q or the typical value BASE1 of block, difference D and quantizing width Q along with switching information.

In the motion picture coding apparatus according to the invention, in which intra- and inter-picture coding modes are used, the coding mode is switched to the DCT or intra-block non-transform coding mode for each unit area (or block) of intra- or inter-picture signal. Switching between the discrete cosine transform (DCT) coding and intra-block non-transform coding (NTC) is thus permitted by providing the convention motion picture coding method, which has the function of discrete cosine transform (DCT) coding alone, a switching information flat specifying either DCT or NTC for each block to be coded or providing a NTC mode by expanding specifying information specifying a mode of unit area (or macro-block) coding. In this way, it is possible to obtain higher efficiency coding of motion picture and also decoding to reproduce higher picture quality motion picture according to the high efficiency coded data.

According to the invention, it is switched into the intra-block predictive coding mode in coding the contour portion of the picture which may be coded with the same information quantity as in coding with the discrete cosine transform, or with less information quantity than in coding with thereof, whereby higher picture quality is obtained with less information quantity as a whole than in the system having the discrete cosine transform mode alone.

When in the intra-block predictive coding also, the representative value of a block and the quantizing width (or the representative value BASE of a block, the difference value between a representative value BASE of a block and the representative value BASE' of another block, and quantizing width) is transmitted to be quantized adaptively, whereby a block distortion may be less. After quantizing also, a reading sequence of coefficients is changed adaptively and then the coefficients is processed to execute a difference coding, if necessary, so as to may improve a coding efficiency.

The nature, principle and utility of the invention will become more apparent from the following detailed description when read in conjunction with the accompanying drawings in which like parts are designated by like reference numerals or characters.

BRIEF DESCRIPTION OF THE DRAWINGS

In the accompanying drawings:

FIG. 3 is a view showing the procedure of coding DCT coefficients;

FIG. 15 is a view showing an algorithm in an example of selection of data scan path used for NTC;

FIG. 21 is a view showing an algorithm in an example of DCT coefficient concentration degree calculation;

FIG. 22 is a view showing positions of intra-block pixels used for the estimation of a typical value of block;

FIG. 24 is a view showing an algorithm in the definition of a DCT/NTC judgment method with C language;

FIG. 25 is a view subsequent to the view of FIG. 24, showing the algorithm in the definition of the DCT/NTC judgment method with C language;

FIG. 26 is a view subsequent to the view of FIG. 25, showing the algorithm in the definition of the DCT/NTC judgment method with C language;

FIG. 27 is a view subsequent to the view of FIG. 26, showing the algorithm in the definition of the DCT/NTC judgment method with C language;

FIG. 28 is a view subsequent to the view of FIG. 27, showing the algorithm in the definition of the DCT/NTC judgment method with C language;

FIG. 33 is a list showing algorithm so as to determine blocking mode; and

DETAILED DESCRIPTION OF THE INVENTION

Preferred embodiments of this invention will be described with reference to the accompanying drawings:

(1) Whole Construction

Figure 1:
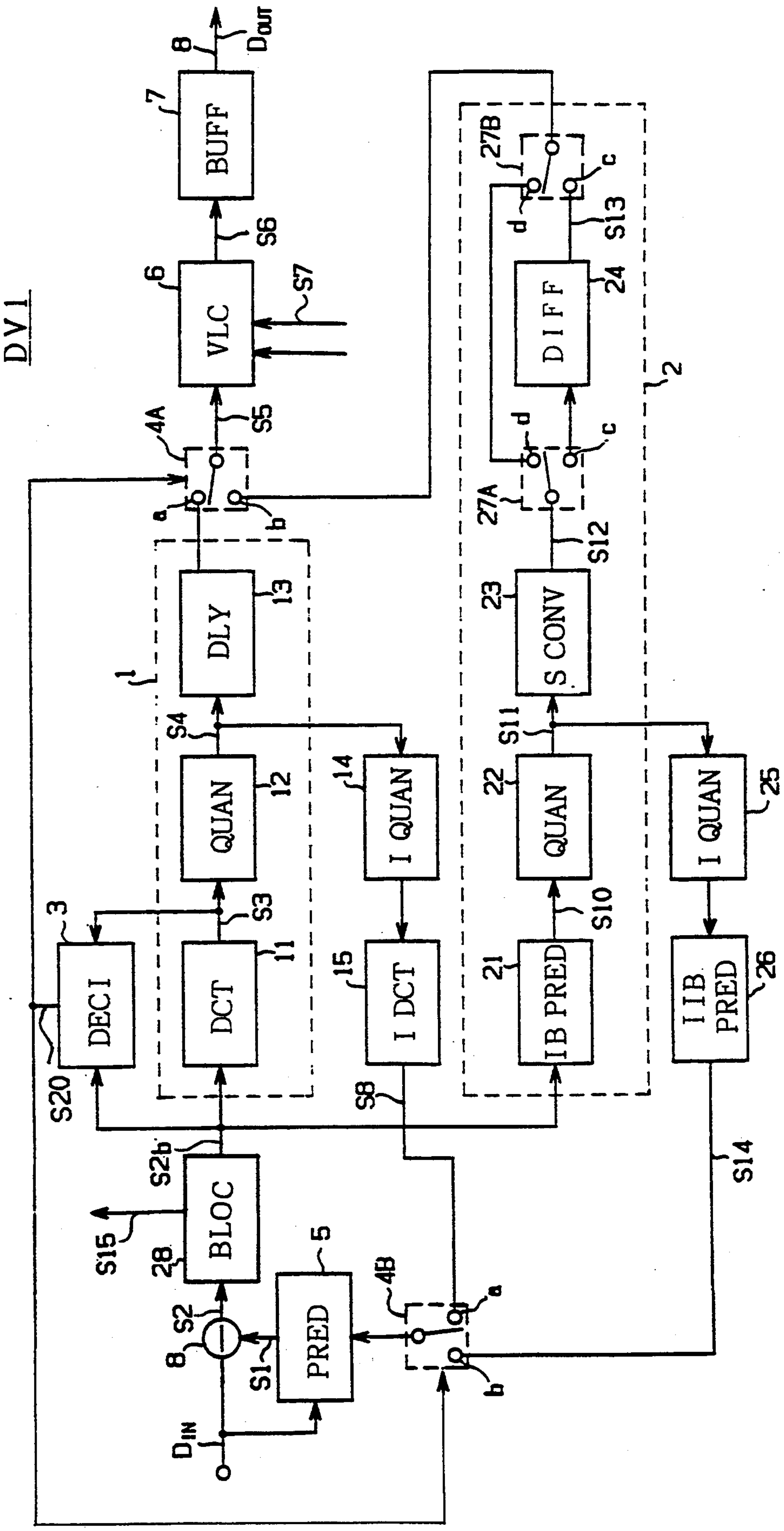
FIG. 1 is a block diagram showing a coder embodying the invention.

Referring to FIG. 1, DV1 generally designates a coding system. A digital input motion picture signal is disassembled by a disassembling circuit (not shown) into blocks each consisting of, for instance, 8 by 8 pixels to be input as block digital input picture signal $D_{IN}$, which is processed through a discrete cosine transform (DCT) coding unit 1, an intra-block non-transform coding (NTC) unit 2 and a coding system judging unit 3.

More specifically, the signal $D_{IN}$ is fed to a predictor 5 and a difference calculator 8. The predictor 5 provides a forecast signal S1. The difference calculator 8 performs either intra- or inter-frame coding to obtain a difference signal S2 between the forecast signal S1 and block digital input picture signal $D_{IN}$, the difference signal S2 being fed to the discrete cosine transform (DCT) coding unit 1 and intra-block non-transform coding (NTC) unit 2, after converting to the block differential signal S2*b* by the blocking circuit 28 following described.

While this embodiment concerns a case of performing either intra- or inter-frame coding, it is possible to permit intra- or inter-field coding as well. In general, intra- or inter-picture (i.e., intra- or inter-frame or intra- or inter-field) coding is converted.

When intra- or inter-frame coding, it is determined in the blocking circuit 28 that the block consisting of the blocking difference signal S2*b* is to be generated in frame unit mode or field unit mode, the blocking difference signal S2*b* is obtained on the basis of the modes. The blocking mode is determined in algorithm shown in FIG. 33, for example, when the difference signal S2 is consisted of 16 by 16 pixels (so-called block or macro block), and as the result, the blocking difference signal S2*b* is obtained by blocking the sub block in four 8 by 8 pixels as shown in FIGS. 34A and 34B.

Figure 34A:
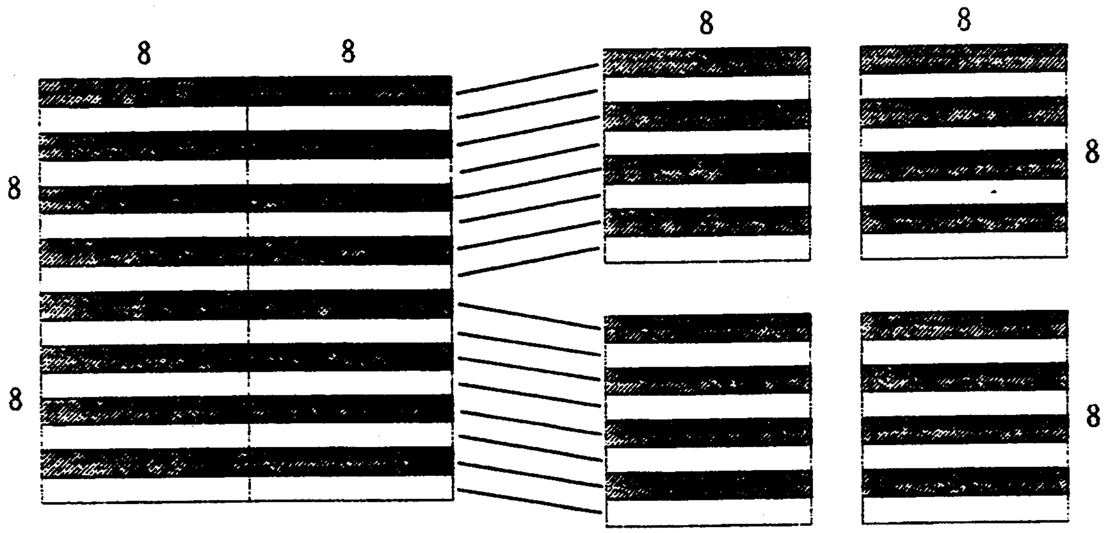
FIG. 34 is a diagram showing macro blocks in frame/field construction.
Figure 34B:
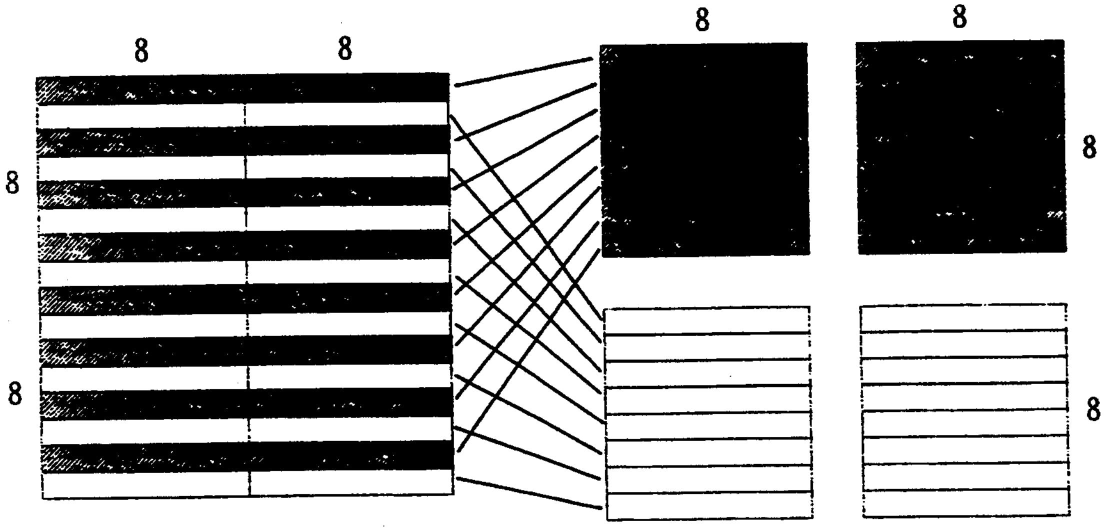

Here, in FIG. 34A, the frame unit block is a block wherein each sub block includes both pixels in an odd field (in oblique line portion) and an even field (in white portion as shown in FIG. 34A). Other hand, the field unit block is a block wherein each sub block consists of pixels of either odd field or even field.

A block mode specifying signal S15 which indicates the decision in the blocking circuit 28 whether a block consists of a frame unit or a field unit is supplied to a variable length coding unit.

In the discrete cosine transform (DCT) coding unit 1, a discrete cosine transform (DCT) circuit 11 performs discrete cosine transform of the difference signal S2 to obtain a discrete cosine transform coded signal S3. A first quantizer 12 then quantizes the signal S2 to obtain a quantized signal S4, which is passed through a delay circuit 13 to a discrete cosine transform (DCT) input terminal a of a first selector 4A.

The first selector 4A outputs a selection output S5, which is converted in a variable length coding (VLC) unit 6 together with transmission control data S7 into a variable length coded signal S6, which is tentatively stored in a buffer 7. The buffer 7 sends out transmission data $D_{OUT}$ at a rate matched to the transmission rate of transmission system 8 such as transmission line and recorder.

The quantized signal S4 from the first quantizer 12 is inversely converted through a first inverse quantizer 14 and an inverse discrete cosine transform (DCT) circuit 15 before being fed back through the discrete cosine transform coding input terminal a of a second selector 4B to the predictor 5. Thus, the predictor 5 reproduces an immediately preceding forecast picture frame represented by the variable length coded signal S6 fed to the buffer 7, the reproduced forecast picture being fed as the forecast signal S1 to the difference calculator 8.

When generating the forecast signal S1, the predictor 5 generates control data of motion vector, forecast mode and calculation system (of intra-/interframe coding) in the difference calculator 8, these data being fed as transmission control signal S7 to the variable length coder 6 for coding together with the data of the selection output S5 into the variable length coded signal S6.

As the discrete cosine transform (DCT) coding unit 1 may be used one, which is shown in, for instance, "Intra-/Inter-Frame External/Internal Non-Transform Coding of HDTV Signals", the Transactions of Institute of Electronics and Communication Engineers Japan Section E, 1987/1, Vol. J70-B, No. 1, p-p. 96–104, or one, which is shown in Japanese Patent Application No. 410247/1990.

In the intra-block non-transform coding (NTC) unit 2, the difference signal S2 from the difference calculator 8 is fed to an intra-block forecaster 21. The intra-block forecaster 21 derives a typical value of block with respect to this difference signal S2 and obtains a difference signal of the typical value from each pixel value. The difference is fed as a non-transform coding signal S10 to a second quantizer 22 for conversion to a quantized signal S11 to be fed to scan converter 23.

The scan converter 23 rearranges the pixel data of the quantized signal S11 to permit further data compression, the rearranged quantized signal S12 being fed through a differentiation input terminal c of a switch 27A to a differentiator 24. The differentiator 24 outputs a differentiation output S13 which is fed through a switch 27B to an intra-block non-transform coding input terminal b of the first selector 4A.

The switches 27A and 27B are adapted such as to bypass, if necessary, the differentiator 24 to feed the rearranged quantized signal S12 through their bypass side terminals d to the intra-block non-transform coding (NTC) input terminals b of the first selector 4A.

Thus, compressed picture data obtained through intra-block non-transform coding of the blocking difference signal S2 is fed through the variable length coder 6 to the buffer 7.

The delay circuit 13 is used to match the process time in the discrete cosine transform (DCT) coding unit 1 to that in the intra-block non-transform coding (NTC) unit 2.

The quantized signal S11 from the second quantizer 22 is inversely converted through a second inverse quantizer 25 and inverse intra-block forecaster 26 into a forecast difference signal S14 to be fed back through a forecast coding input terminal b of the second selector 4B to the forecaster 5. The forecaster 5 reproduces the immediately preceding picture frame represented by the variable length coded signal S6 fed to the buffer 7, thus obtaining the forecast signal S1.

The difference signal S2 of the difference calculator 8 and the discrete cosine transform signal S3 of the discrete cosine transform circuit 11 are further fed to the coding system judging unit 3. The unit 3 thus effects judgment as to whether the discrete cosine transform of the intra-block pattern is disadvantageous for the data compression factor, thus generating a coding system switching signal S20. If the discrete cosine transform system is advantageous, the first and second selectors 4A and 4B are switched to the side of the discrete cosine transform coding input terminal a to cause the discrete cosine transform coding unit 1 to execute the coding of the difference signal S2.

If the discrete cosine transform system is disadvantageous for the data compression factor, on the other hand, the coding system judging unit 3 switches the first and second selectors 4A and 4B to the side of the intra-block non-transform coding input terminal b according to the coding system switching signal S20, thus causing the intra-block non-transform coding unit 2 to execute the coding of the difference signal S2.

When generating the coding system switching signal S20, the coding system judgment unit 3 generates a coding system switching signal representing the selected coding system, the switching signal thus generated being fed as the transmission control signal S7 to the variable length coding unit 6.

Figure 2:
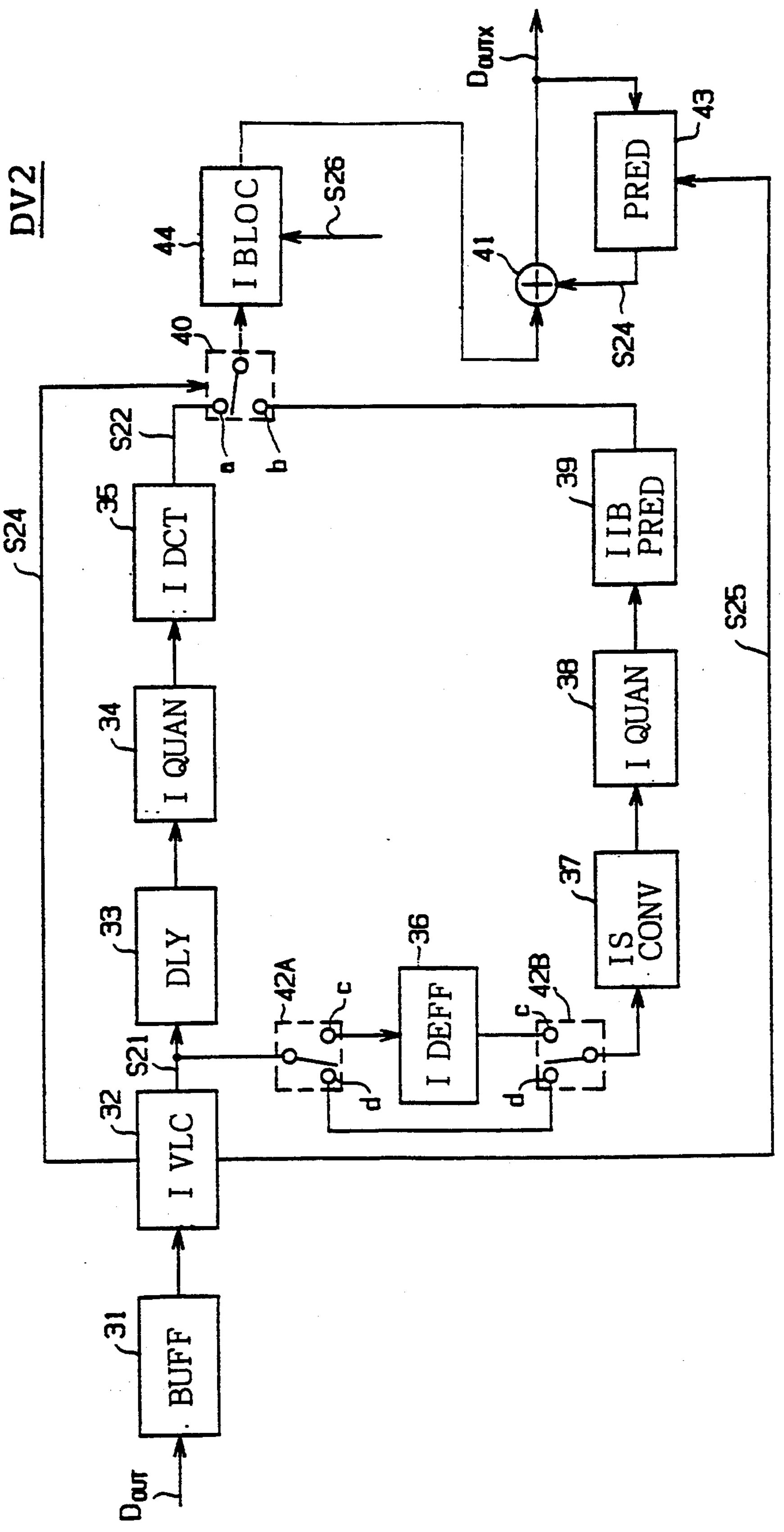
FIG. 2 is a block diagram showing a decoder embodying the invention.

The transmission data $D_{OUT}$ fed from the coding system DV1 to the transmission system 8 in the above way, is stored in a decoding system DV2 shown in FIG. 2 for inverse coding in an inverse variable length coding unit 32, and then a decoded quantized signal S21 and management signal (a coding method switching signal S24, a predictive mode signal S25, and a blocking mode signal S26 etc.) are separated.

In this way, of the transmission data $D_{OUT}$ a decoded quantized signal S21 is fed through a delay circuit 33 for inverse quantizing in the inverse quantizer 34 and then fed to an inverse discrete cosine transform circuit 35 to reproduce the difference signal S22, which is fed through an inverse discrete cosine transform input terminal a of a switch 40 to a summation reproduction circuit 41. In the coding unit shown in FIG. 1, a common quantizer may be used as the quantizer 12 and 22, if both characters of which are equal. In the same way, a common inverse quantizer may be used as the inverse quantizer 14 and 22, if both characters of which are equal.

The decoded quantized signal S21 is also fed through a differentiator input terminal c of switch circuits 42A and 42B to an inverse differentiator 36 for inverse differentiation and then fed to an inverse scan converter 37, or it is fed as such through bypass input terminals of switch circuits 42A and 42B to the inverse scan converter 37. The decoded quantized signal S21 is thus restored in the inverse scan converter 37 to the original scan order and then inversely converted through an inverse quantizer 38 and an inverse intra-block forecaster 39, thus obtaining a reproduced difference signal S23 which is fed through an intra-block non-transform coding input terminal b of a switch circuit 40 to the summation reproduction circuit 41. In the decoder shown in FIG. 2, the inverse scan converter 37 and the inverse quantizer 38 may be changed each other.

To the switch 40 is fed a coding system switching signal S24 in the control signal separated in the inverse variable length coding unit 32. Thus, the switch 40 is switched to the side of the input terminal a or b according to the coding system of the transmitted decoded quantized signal S21. The output from switch circuit 40 is fed to the inverse blocking circuit 44, to which the blocking mode signal S26 is supplied, which is one of management signals separated in the inverse variable length coding unit 32, so that a block is reconstituted of difference signals S22 and S23 presently transmitted.

The summing reproduction circuit 41 sums an output signal from the inverse blocking circuit 44 and predicting signal S24 obtained from predictor 43, and the summing output is derived as a production data $D_{OUTX}$.

In the decoder shown in FIG. 2, a common inverse quantizer may be used as the inverse quantizer 34 and 38, when both characteristic of which are equal.

The coding units DV1 (FIG. 1) and DV2 (FIG. 2) have the following detailed constructions.

(2) Discrete Cosine Transform Coding Unit 1

The discrete cosine transform circuit 11 in the discrete cosine transform coding unit 1 in the coding system DV1 (FIG. 1), executes a compression processing when changes in the inputted blocking difference signal S2*b* (and hence brightness changes) are smooth, by making use of a well-known feature of the two-dimensional picture of the discrete cosine transform method that there is a trend of concentration of large values as values of the discrete cosine transform signal S3 (i.e., DCT coefficient values) in the neighborhood of DC coefficient.

FIG. 3 shows an example of schematic representation of pixel data quantity of one block (8 by 8 pixels) of picture in terms of numerical Figures of 0 to 100. K1 is the block of the original picture. As shown, the brightness level is changed smoothly from the left top corner toward the right bottom corner. Each pixel has a brightness level of 30 to 100. When this original picture K1 is subjected to a discrete cosine transform (DCT) process in the discrete cosine transform circuit 11, substantially all the intra-block coefficients are reduced to 0 in the discrete cosine transform signal S3. The result is shown as transformed picture K2. DCT coefficients having values other than 0 are present on the diagonal from the left top corner to the right bottom corner.

When the DCT coefficients of the transformed picture K2 are subsequently quantized in the first quantizer 12 with a quantizing width Q of Q=10, for instance, which is provided from the buffer 7 with respect to the residual data quantity therein, almost all the quantized DCT coefficients in the quantized signal S4 are reduced to 0, and only large quantized DCT coefficients remain. This result is shown as quantized picture K3. Thus, by calling out the quantized DCT coefficients of the quantized picture K3 successively according to a coefficient call-out sequence K4 (numerical Figures representing orders of call-out), a quantized DCT coefficient series "45-0-0-4-13-4-0-0- . . . " is obtained. By feeding this series through the delay circuit 13 and first selector 4A to the variable length coding (VLC) unit 6, a higher performance coding process can be obtained using a variable length coding method based on Huffman coding or the like (two-dimensional coding in this embodiment).

Figure 4:
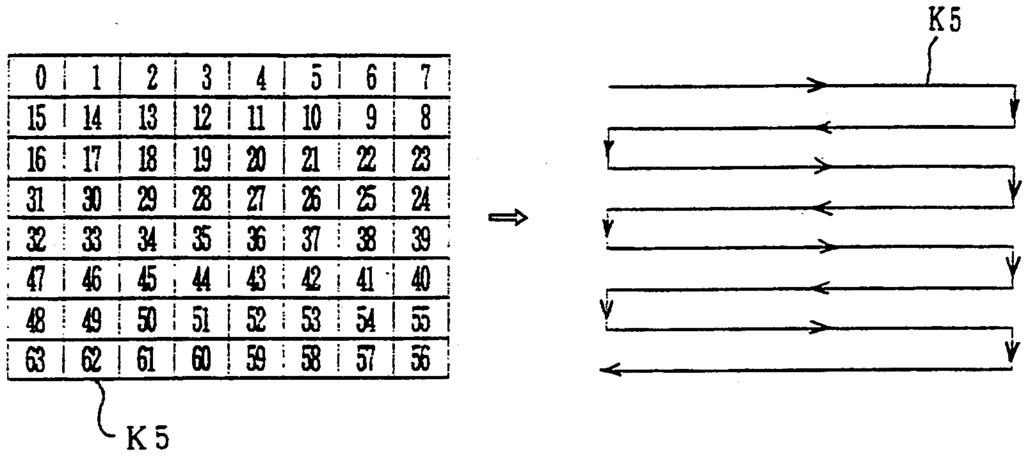
FIG. 4 is a view showing the procedure of call-out of coefficients.

The coefficient call-out series K4 in the case of FIG. 3, the coefficient call-out orders are arranged in an obliquely zigzag fashion from the left top start point toward the right bottom from the consideration of the existence of a two-dimensional correlation of pixels. FIG. 4 shows a coefficient call-out series K5, which may be used for patterns having a horizontally strong correlation of coefficients. In this case, the coefficients are sequentially called from the top row (0 to 7) of the block and in a vertically zigzag fashion (8 to 15), (16 to 23), . . .

(3) Intra-Block Non-Transform Coding Unit 2

In the intra-block non-transform coding unit 2, when one block (8 by 8 pixels) of picture data, which contains an edge of a pattern at the left bottom corner, shown as original picture K11 (FIG. 5A), is fed as blocking difference signal S2*b*, the intra-block forecaster 21 first obtains the mean value of flat area as a typical value "BASE" of block and then obtains the difference between the typical value BASE and each intra-block pixel value.

Figures 5A, 5B, 5C, 5D, 5E, 5F, 5G:
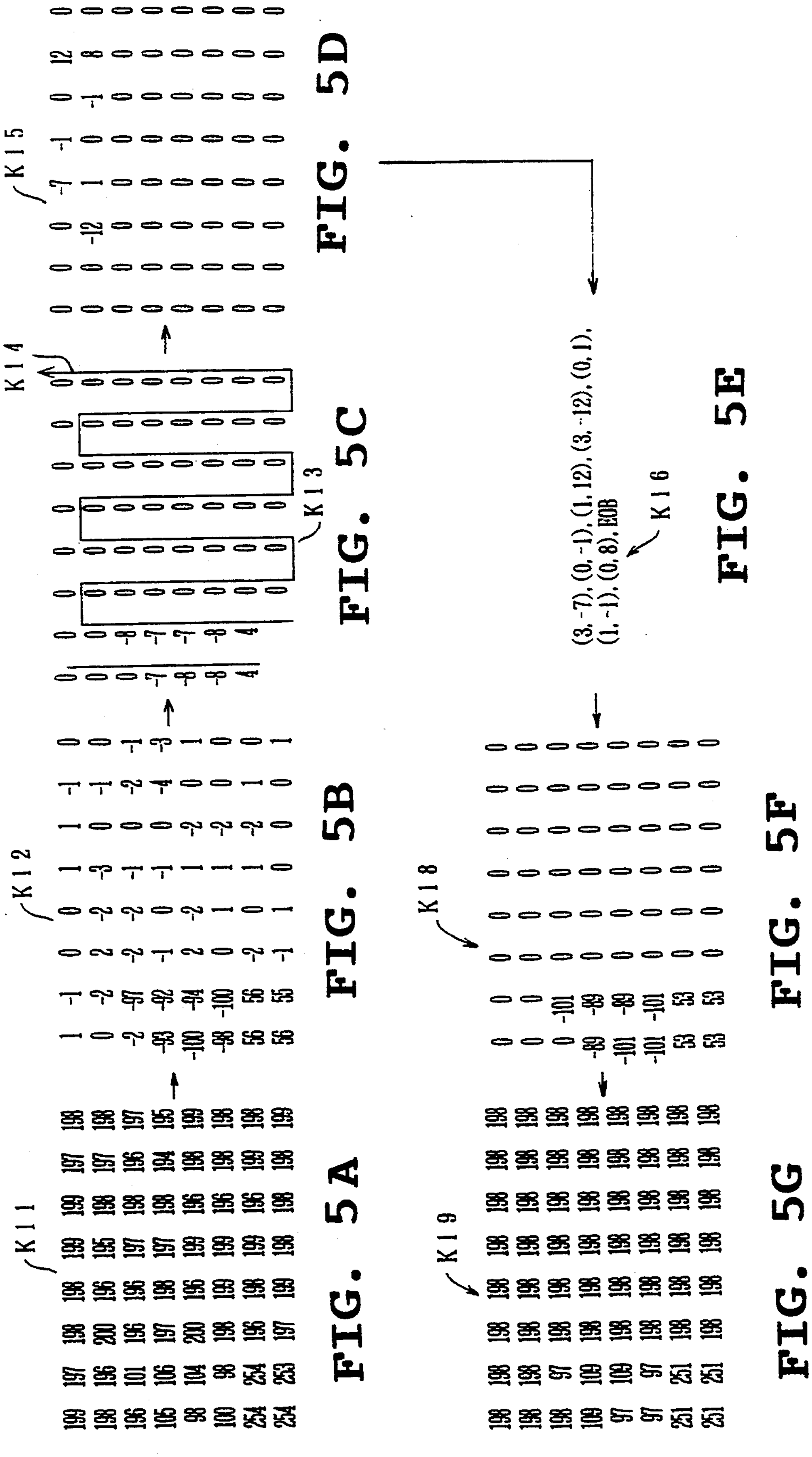
FIG. 5 is a view showing the procedure of intra-block non-transform coding.

In the case of The original picture K11 in FIG. 5, the intra-block forecaster 21 obtains BASE=198 as the typical value BASE, then obtains forecast picture K12 (FIG. 5B) by calculating the difference between the typical value BASE and each pixel value and feeds the data K12 as a forecast signal S10 to the quantizer 22.

The quantizer 22 quantizes the difference values of the forecast signal S10 with an adaptive quantizing width Q of, for instance, Q=12 to obtain a quantizing coefficient distribution K13 (in FIG. 5C). In this embodiment, in the calculation of quantizing decimal fractions are discarded (which is equivalent to a quantizer having a dead line zone with a value of 6).

For the adaptive quantizing in the intra-block non-transform coding (NTC) unit 2, one or more of the following four methods are selectively used for each block.

Figure 6:
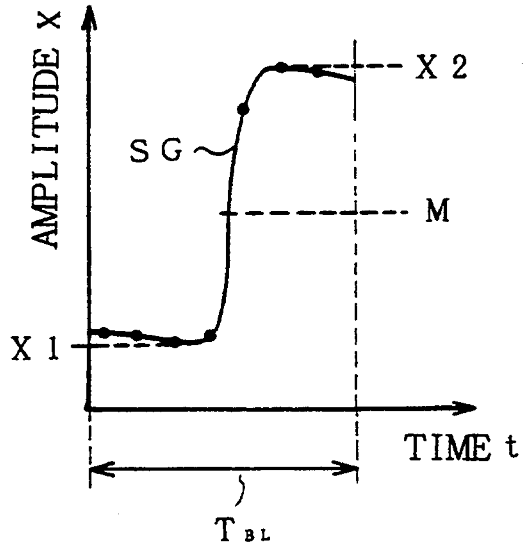
FIG. 6 is a graph showing a characteristic curve when using mean values.
Figure 7:
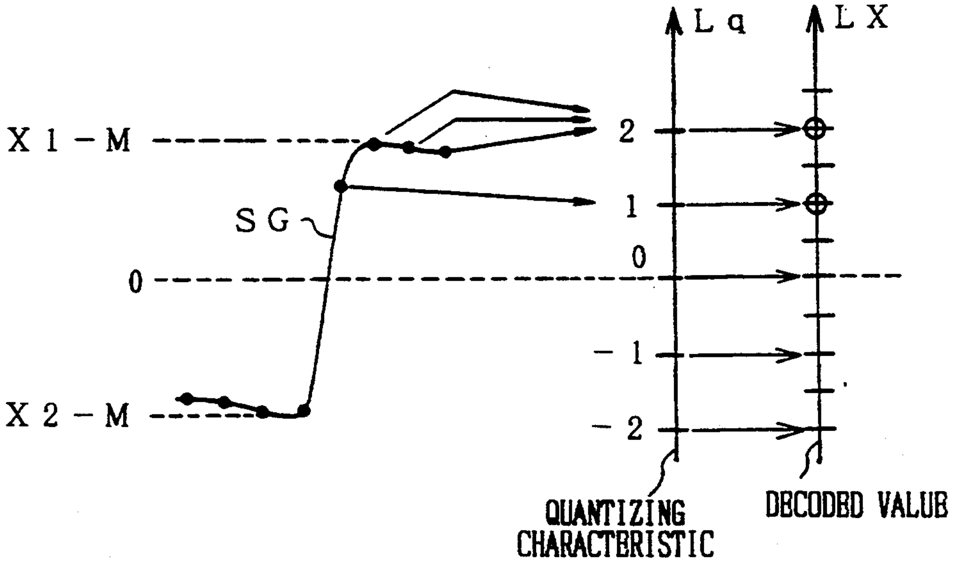
FIG. 7 is a graph showing a characteristic curve of quantizing and decoding when using means values.
Figure 8:
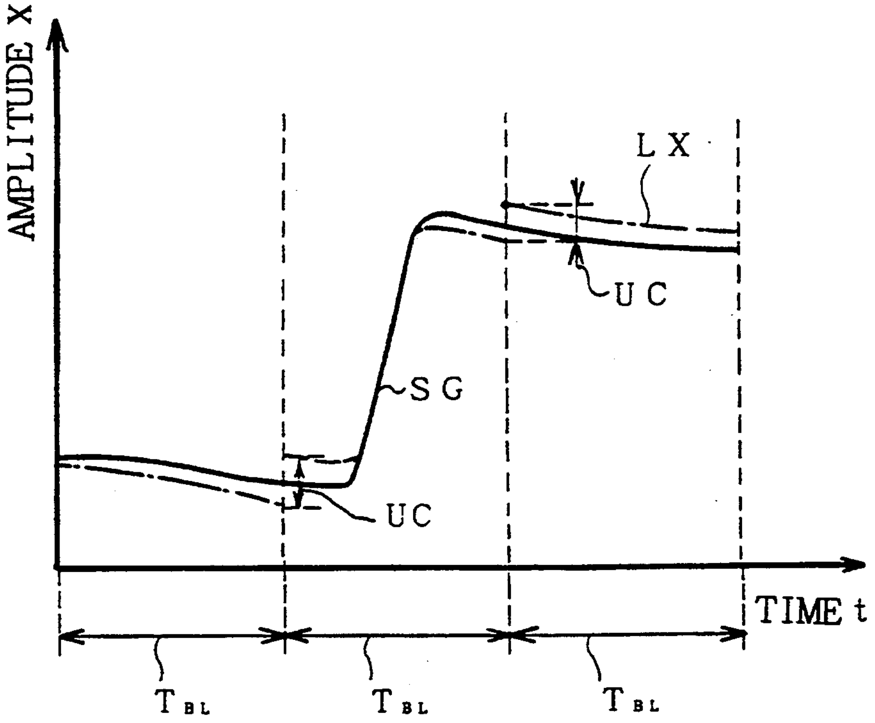
FIG. 8 is a graph showing a characteristic curve in an example of block distortion when using mean values.

A first method of adaptive quantizing uses the mean value of picture signal in the block. More specifically, as shown in FIG. 6, the mean value M of the amplitudes (X1 to X2) of all the intra-block pixels of one-dimensional digital original signal SG is obtained for one block length $T_{BL}$ with respect to time t, and then the difference between the mean value M and signal level (i.e., amplitude X) of each pixel is quantized, as shown in FIG. 7. The quantizing width Q is a value output from the buffer 7 according to the residual data quantity therein. The quantizing code $L_q$ is given as following:

$$L_q=(L-M)//Q \quad (1)$$

(where // represents the rounding of the first decimal place).

The reproduced value LX is given as following:

$$LX=L_q*Q+M \quad (2)$$

This first adaptive quantizing method as a disadvantage that with increase of the quantizing width Q the reproduced value distortion is increased. As a result, discontinuity UC is generated in changes in the reproduced value LX with respect to the original signal SG for each block, thus generating block distortion.

A second method of adaptive quantizing uses adaptive dynamic range coding (ADRC). This method is shown in "Study on Quantizing Systems for Dynamic Range Coding", Kondo et al, the 4-th Picture Coding Symposium (PCSJ), Material (4-3). This adaptive dynamic range coding (ADRC) has a feature that a minimum value of block is used as a typical value. This is done so because the minimum value is in many cases found in an edge port of the block.

With the usual block, which is as small area as about (8 by 8) pixels, the possibility of occurrence of a concave brightness level distribution is very low. Therefore, in many cases the minimum value of a block is close to the minimum value of one of the neighboring blocks.

Figure 9:
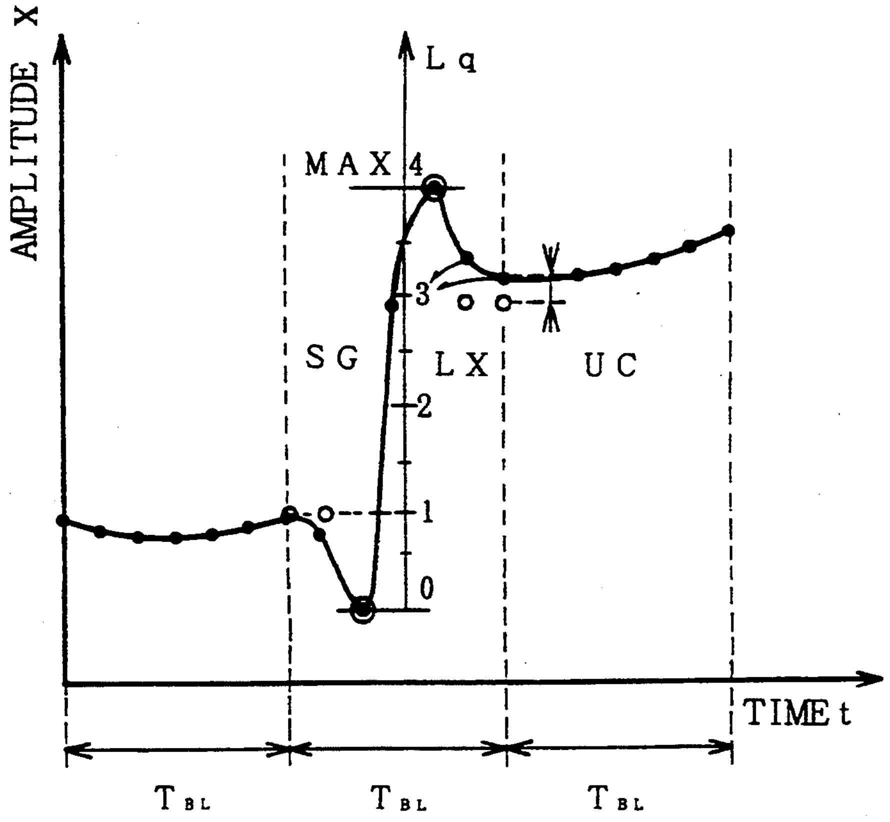
FIG. 9 is a graph showing a characteristic curve when using ADRC.

If a minimum value is found at an edge of the block, as shown in FIG. 9, the continuity with respect to at least one neighboring block (on the block length start side in this case). Thus, even if discontinuity UC is produced with respect to a neighboring block due to deviation between the original signal SG and reproduced value LX, the block distortion as a whole can be minimized.

Figure 10:
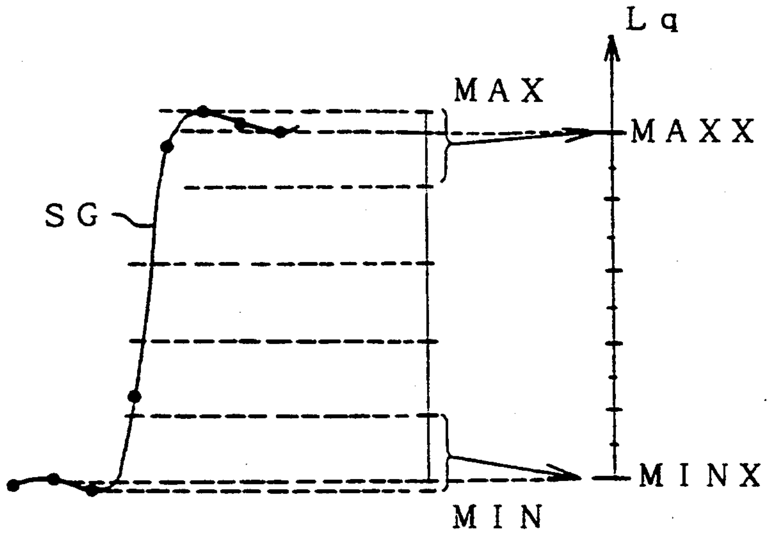
FIG. 10 is a graph showing a characteristic curve in an example of block distortion when using ADRC.

Further, the adaptive dynamic range coding method permits the quantizing code $L_q$ to be obtained after defining new maximum value MAXX and minimum value MINX by using the mean value of signal values contained in the highest and lowest gradation levels, as shown as a one-dimensional coding characteristic in FIG. 10, thus alleviating the influence of noise and isolated points (as shown in Japanese Patent Application Public Disclosure 134910/1990).

Figure 11:
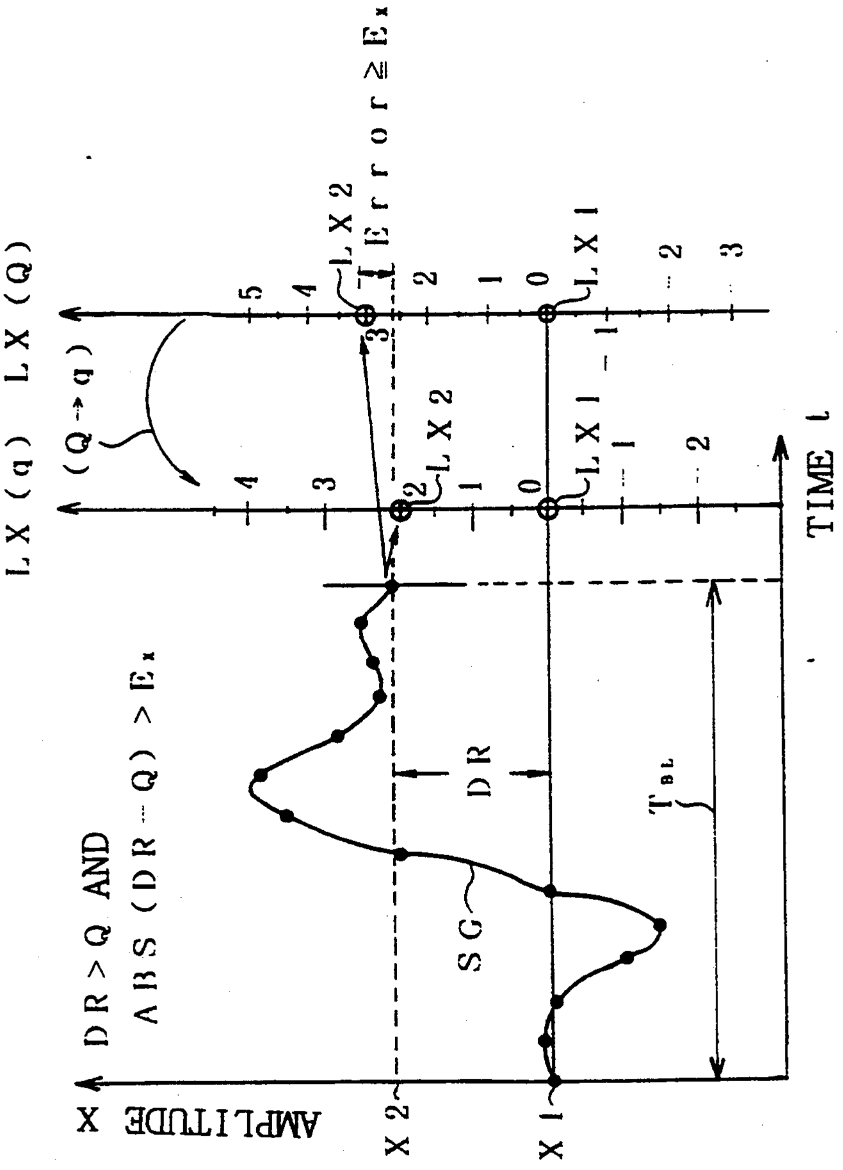
FIG. 11 is a graph showing a characteristic curve in a first edge matching quantizing method.
Figure 12:
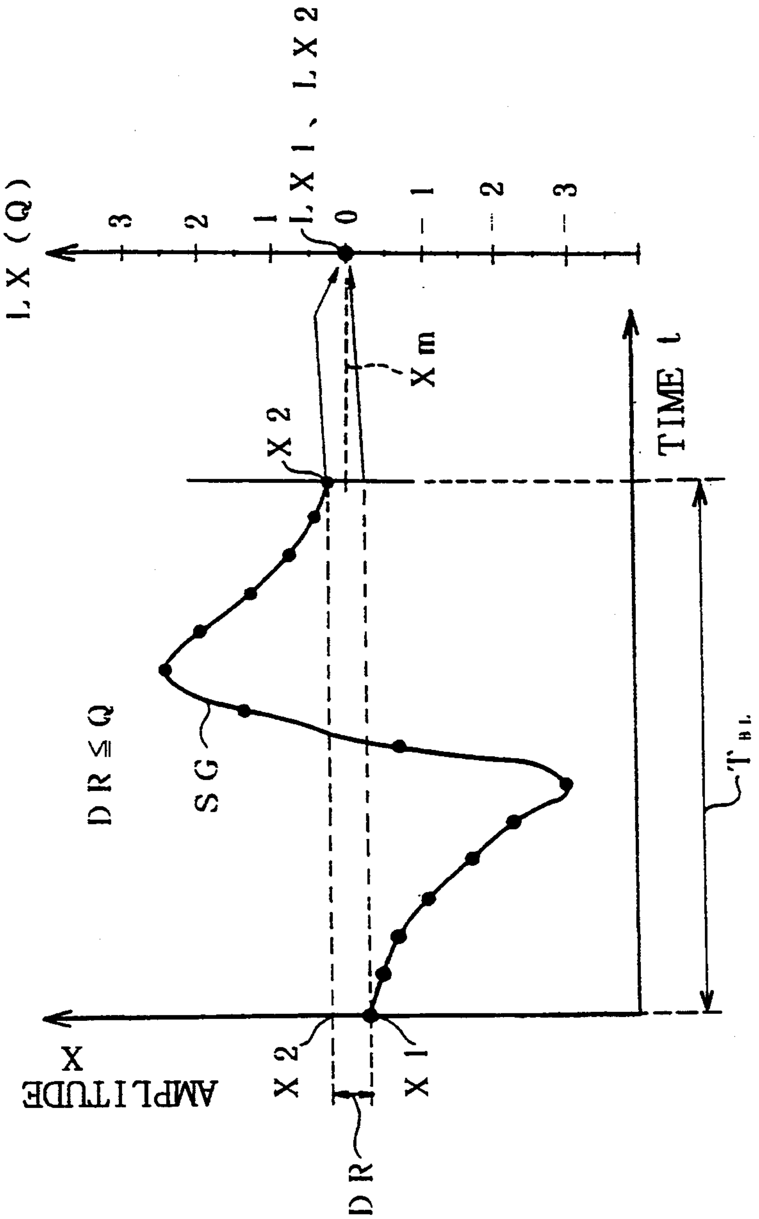
FIG. 12 is a graph showing a characteristic curve in the first edge matching quantizing method.

A third method of adaptive quantizing uses edge matching quantizing. This method will be described in conjunction with first a case, in which the digital original signal SG is one-dimensional. In the third adaptive quantizing method, the quantizing width output from the buffer 7 is altered such that with respect to the one-dimensional original signal SG of a block length $T_{BL}$ as shown in FIGS. 11 and 12 the output reproduced values LX1 and LX2 of the opposite end signal values X1 and X2 (X1≦X2 for the sake of the simplicity) of the block are less than a predetermined error Ex. The algorithm involved is as follows.

Denoting the intra-block pixel signal level by L and the permissible reproduced value error of the block end signal values X1 and X2 by Ex, the difference D between the block end signal values X1 and X2 is $$D=X2-X1 \quad (3)$$

As for the quantizing width Q and signal value X1, if $$D>Q \quad (4)$$

and also if $$ABS(D-Q)>Ex \quad (5)$$

the quantizing width Q instructed by the buffer 7 is changed to a quantizing width q instructed to the quantizer 22 from the intra-block forecaster 21, while the signal value X1 is held without any change.

However, for the quantizing width q values greater than the quantizing width q and satisfying ps $$Ex \geqq ABS(D-(D//q)*q \quad (6)$$

are obtained with respect to all the sets of quantizing width Q and difference D and written as table in a read-only memory (ROM).

If $$D>Q \quad (7)$$

and also if $$Ex \geqq ABS(D-Q) \quad (8)$$

Both the quantizing width Q and signal value X1 are held without any change.

If $$D<Q \quad (9)$$

the quantizing width Q is held without any change, while providing $$Xm=(X1+X2)//2 \quad (10)$$

and $$X1=Xm \quad (11)$$

Consequently, we obtain, as the quantizing code $L_q$, $$L_q=(L-X1)//Q \quad (12)$$

and, as the reproduced value LX, $$LX=L_q*Q+X1 \quad (13)$$

In this system, the error of the reproduced signal at the opposite ends of the block can be held within Ex, and thus it is possible to readily maintain enhanced inter-block continuity.

While the above description has concerned with the case of applying the third adaptive quantizing method to the one-dimensional digital original signal SG, in case of expanding this one-dimensional method to two-dimensional blocks, typical values BASE1 and BASE2 are used for the respective signal values X1 and X2, and the block signal is quantized and inversely quantized like the one-dimensional case.

While the above description has concerned with a quantizer without any dead zone (or insensitive zone), it is possible to use a quantizer with a dead zone as well.

Figure 13:
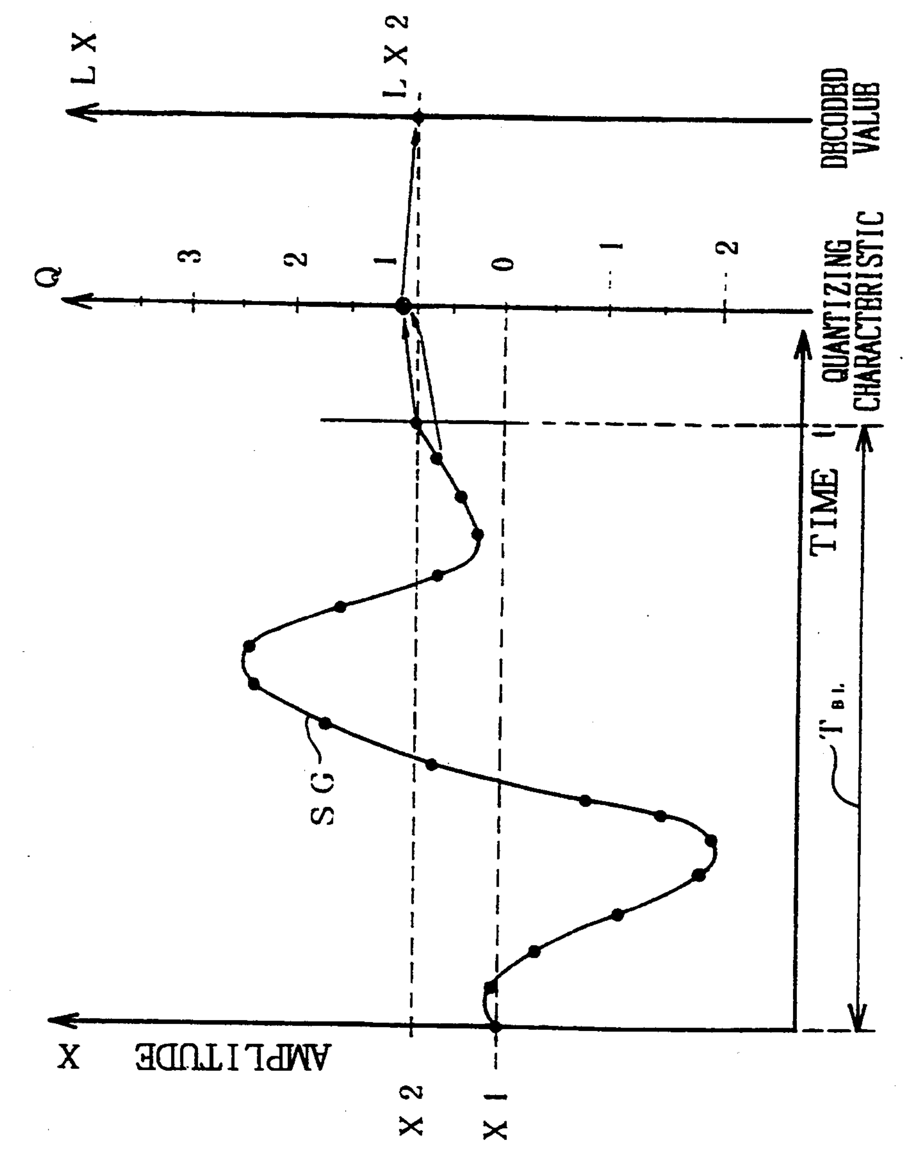
FIG. 13 is graph showing a characteristic curve in a second edge matching quantizing method.

A fourth method of adaptive quantizing uses second edge matching quantization. The method will first be described in conjunction with a case, in which the digital original signal SG is one-dimensional. In this method, the decoded values are changed on the decoder side such that the signal values X1 and X2 ($X1 \leqq X2$ for the sake of the simplicity) with respect to the one-dimensional original signal SG of a block length $T_{BL}$ as shown in FIG. 13 are output directly as decoded values. Denoting the intra-block pixel signal level by X and the quantizing width data output from the buffer 7 by Q, the quantization code $L_q$ is $$L_q=(L-X1)//Q \tag{14}$$

The coding system DV1 (FIG. 1) transmits, in addition to the quantizing code $L_q$, the signal value X1, the difference D between the signal values X1 and X2 and the quantization width Q to the decoding system DV2. In the decoding system DV2, the signal values X1 and X2 and quantizing width Q are received as quantizing parameters, and a quantized value 2q of the signal value X2 is first calculated using an equation:

$$X2q=(X2-X1)//Q \tag{15}$$

Then the reproduced value LX is restored as $$LX=LX2 \tag{16}$$

if the quantizing code $L_q$ is equal to $X2_q$, and otherwise as $$LX=L_q*Q+X1 \tag{17}$$

The second edge matching quantizing method is simple in algorithm compared to the previous first edge matching coding method and permits simplification of the constitution in that no ROM table for changing the quantizing width Q is needed.

When expanding this second edge matching quantizing method to two-dimensional block signal, typical values BASE and BASE' are used as the respective signal values X1 and X2 for quantizing and inverse quantizing of the block signal as in the case of one-dimensional block signal.

While the above description has concerned with a quantizer without dead zone (or insensitive zone), it is possible to use a quantizer with a dead zone as well.

The functions of the quantizer and inverse quantizer described in connection with the above first to fourth adaptive quantizing methods are the same as those broadly used in the discrete cosine transform (DCT) coding except for the execution of the subtraction or addition of a typical value of block. Thus, it is possible to permit the quantizer and inverse quantizer to be used commonly in the intra-block non-transform coding (NTC) unit 2 and discrete cosine transform (DCT) coding unit 1 by making the processing of subtraction or addition of the typical value of block independent from the quantizer and inverse quantizer.

Figure 14A:
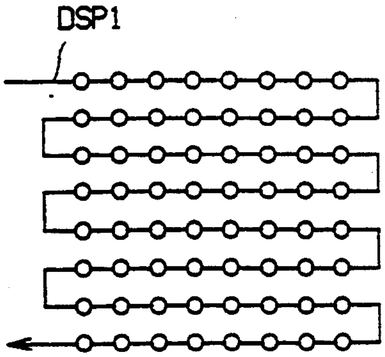
FIG. 14 is a view showing an example of data scan path used for NTC.
Figure 14B:
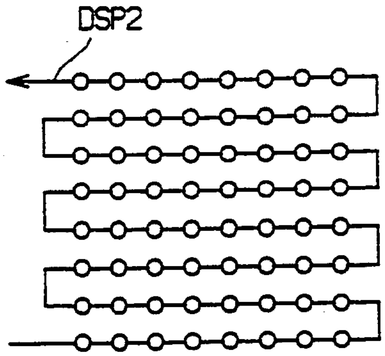
Figure 14C:
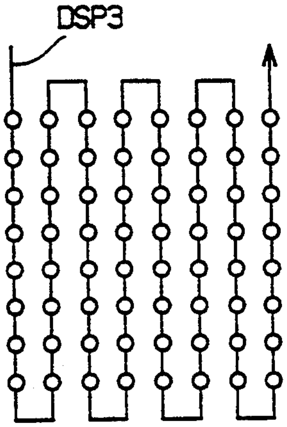
Figure 14D:
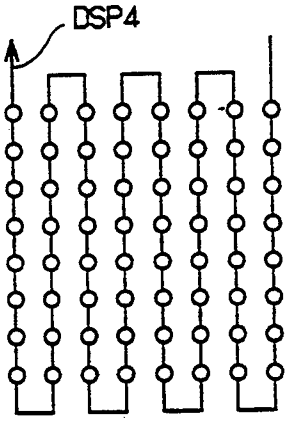

Subsequently, the scan converter 23 (FIG. 1) executes adaptive coefficient call-out according to a quantized coefficient distribution K13 (in FIG. 5C) represented by the quantized signal S11. In this embodiment, the quantized coefficients in the quantized coefficient fashion as represented by a coefficient call-out sequence K14 (in FIG. 14C). In this way, the rearranged quantized signal S12 produced as a result of rearrangement of the individual quantized coefficients is output from the scan converter 23.

The block signal after the quantization, fed to the scan converter 23 of the intra-block non-transform coding (NTC) unit 2, is rearranged by scan conversion back to the one-dimensional arrangement. The block signal after the quantizing is transmitted by an end-or-block (EOB) method. In this method, the scan converted signals are scanned in their sequence, and if there is a continuation of coefficients of "0" up to the last coefficient, this continuation of "0"s is transmitted as a sole code "EOB".

Thus, by selecting a data scan path, which permits transmission of the code "EOB", in as early timing as possible, high compression factor data coding can be obtained.

In this embodiment, four different data scan paths DSP1 to DSP4 shown in FIGS. 14A to 14D are prepared. One of these first to fourth data scan paths DSP1 to DSP4 is adaptively selected according to the intra-block edge shape.

FIG. 15 shows the accurate definition of the algorithm in C language. The summation of the absolute values of the block signal after the quantizing in each of four areas "PIXEL_AREA1", "PIXEL_AREA2", "PIXEL_AREA3" and "PIXEL_AREA4" shown in FIG. 15A is calculated, and the area having the greatest summation is detected. The data scan path is selected according to the result of detection.

Figure 16:
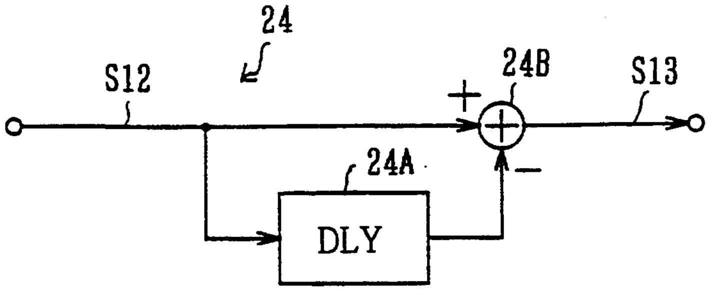
FIG. 16 is a connection diagram showing a differential coding circuit.

Finally, the differentiator 24 differentiates the rearranged data, having been fed to it through the switch 27A (FIG. 1), consecutively from the start of the data and between adjacent data to obtain a differentiated distribution K15 (in FIG. 5D). In the differentiator 24, as shown in FIG. 16, a delay line 24A delays the rearranged quantized signal S12 by one process period, and a subtracter 24B subtracts the delayed signal from the rearranged quantized signal S12 form a differentiated distribution K15, the subtraction output being transmitted as a differentiated output S13.

There are cases when there still remain much self correlation of signal in the coefficients after the scan conversion. Thus, further data compression is possible by subsequently executing a differentiating process. The differentiator 24 takes the difference of pixel value with respect to the value of the immediately preceding pixel for signal Yi obtained after the scan conversion in the scan converter 23, thus obtaining a forecast error signal Ei given as $$Ei=Yi-Y(i-1) \tag{18}$$

This forecast error signal Ei can take a value of −255 to +255 if the input signal is of 8 bits. Thus, if it is to be transmitted without changing its signal form, 9 bits are required, that is, one extra bit is necessary as a code perpixel. However, it is well known that the forecast error signal Ei is mostly concentrated around zero as its center. Thus, instead of expressing all the signals with 9 bits, by assigning small bit length codes to a large number of signal values the block signal of the whole block can be expressed with a mean bit length, which is not only smaller than 9 bits but also far smaller than the original 8-bit input signal.

As a method of on-off switching the differentiator 24, if the number of signals other than zero is found to be reduced as a result of actual differentiating processing, the differentiator 24 is turned on, that is, the switches 27A and 27B are switched to the side of the differentiator 24. Otherwise, the switches 27A and 27B are switched to the bypass side.

The coded differential data which is thus obtained in the intra-block non-transform coding unit 2 is coded in the variable length coding (VLC) unit 6 by Huffman variable length coding (in this embodiment by the two-dimensional coding as noted above) to form Huffman code series K16 (in FIG. 5E). In this way, high efficiency coding can obtained.

The transmitted data $D_{OUT}$ obtained in the coding system DV1, having been transmitted on the basis of the Huffman code series K16 (in FIG. 5) to the decoding system DV2, is inversely converted through the inverse variable length coding unit 32, inverse differentiater 36, inverse scan converter 37 and inverse quantizer 38 to obtain an inversely quantized coefficient distribution K18 (in FIG. 18) and then restored to a reproduced picture K19 (in FIG. 5G). With addition of typical value BASE1 through the forecaster 43 and adder 41.

Figures 17A, 17B, 17C, 17D, 17E, 17F, 17G:
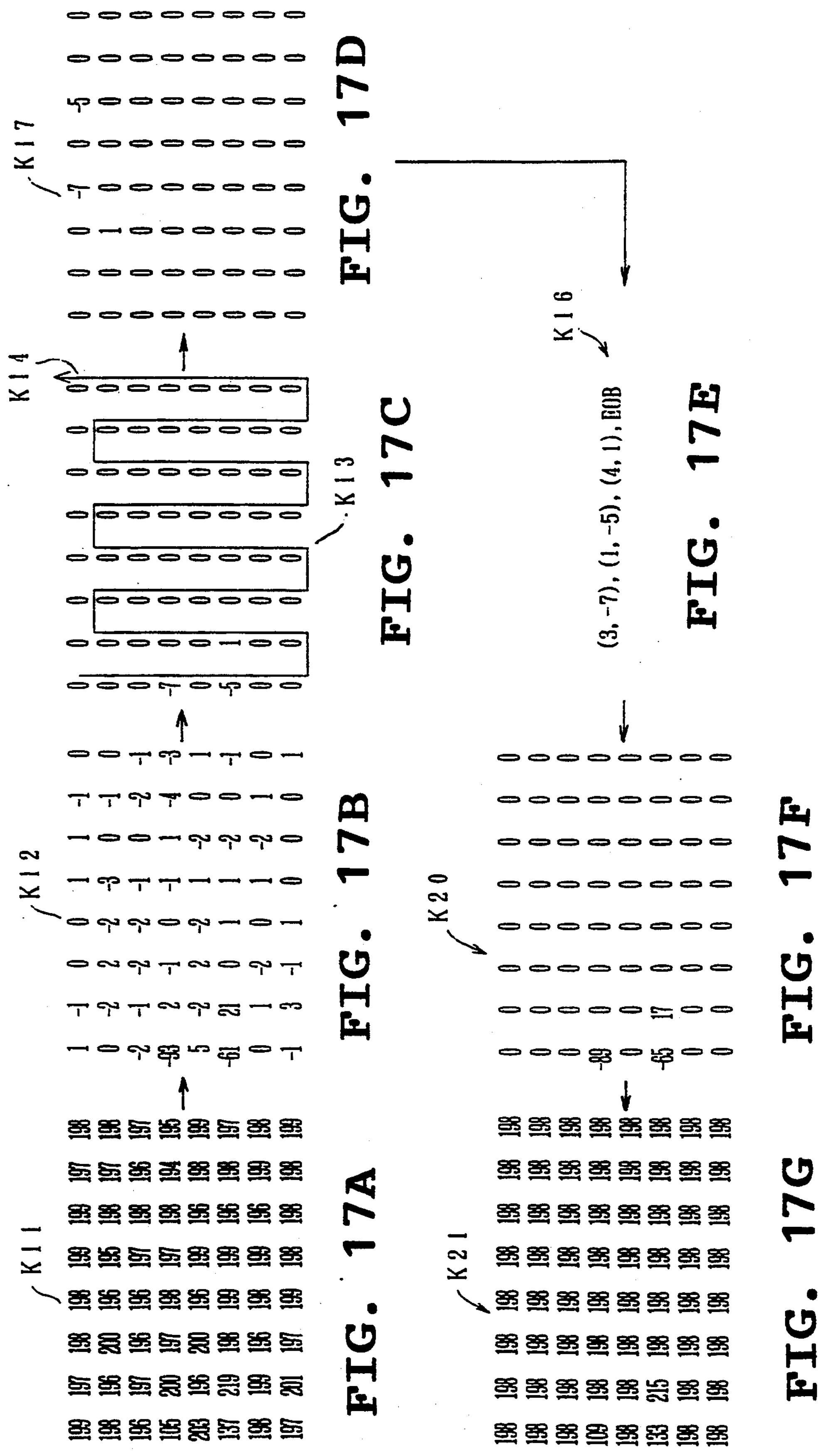
FIG. 17 is a view showing a different procedure of intra-block non-transform coding.

In case when the differentiator 24 (FIG. 1) is unnecessary, the switches 27A and 27B are switched to the side of the bypass output terminal d to lead the rearranged quantized signal S12 along the bypass. In this case, as shown in FIG. 17 in correspondence to FIG. 5, a forecast picture K12 (in FIG. 17C) are quantized coefficient distribution (in FIG. 17C) are obtained consecutively according to the original picture K11 (in FIG. 17), and then by calling out coefficients in a coefficients in a coefficient call-out sequence K14 (in FIG. 17C) a coefficient distribution K17 (in FIG. 17D), which is obtained by merely rearranging the quantized coefficient values of the quantized coefficient distribution K13, is fed to the variable length coder 6, thus obtaining a Huffman code series K16 (in FIG. 17E).

Again in this case, an inversely quantized coefficient distribution K20 (in FIG. 17F) and a reproduced picture K21 (in FIG. 17G) are restored in the decoding system DV2.

(4) Coding System Judging Unit 3

In a first method of coding system judging, the judging is effected in the picture block space area. With a pattern having sharp brightness changes (specifically a picture including edge portions or detailed portions), the dynamic range DR (DR=(maximum value)−-(minimum value)) of intra-block picture signal takes a large value. With such a pattern the discrete cosine transform (DCT) is disadvantageous for the data compression factor. That is, the intra-block non-transform coding (VTC) has to be selected. In this case, the coding system judging unit 3 derives the intra-block dynamic range DR for each block, and for a block, if any, with a value of DR exceeding an appropriate threshold value THA selected from the compression factor and pattern deterioration, the unit 3 judges that the intra-block non-transform coding (NTC) unit 2 should be used for the coding.

In a second method of coding system judging, the judging is effected in the discrete cosine transform (DCT) output area. As for the discrete cosine transform coefficients in case when motion picture signal is subjected to two-dimensional discrete cosine transform in blocks (or macro-blocks) each of 8 by 8 pixels, for instance, coefficient F(0,0) in row 0 and column 0, corresponding to the left top corner of the block, corresponds to a DC component representing the intra-block mean brightness of the picture. As one goes to the right from the coefficient F(0,0), the coefficients represent high frequency components of vertical fringes in the block, and as one goes down, the coefficients represent horizontal fringe high frequency components.

FIG. 18 shows an output obtained as a result of the discrete cosine transform of a block having a sharply changing brightness pattern like an edge portion. Output areas of discrete cosine transform coefficients in the 8-by-8 pixel block can be largely classified into the following three different pattern cases. In FIG. 18, the circle mark represents a position of a high (or low) brightness pixel, and the cross mark represents a position, at which a large intra-block discrete cosine transform coefficient is liable to be generated.

Figure 18A:
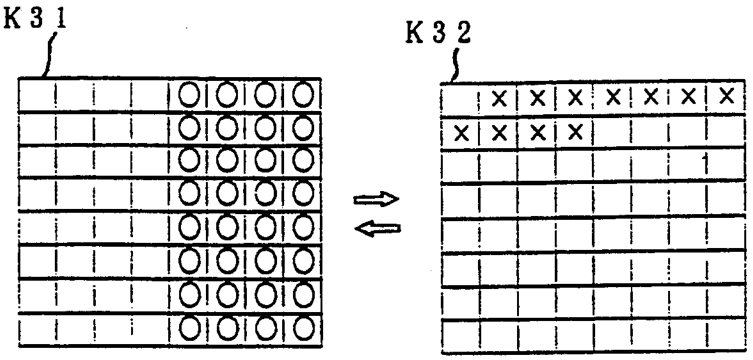
FIG. 18 is a view showing the relation between edge and DCT coefficient.

A first pattern, as shown in FIG. 18A, is in a case of a block picture area K31 having a vertical edge. In this case, the discrete cosine transform output area K32 has high energy discrete cosine transform (DCT) coefficients concentrated in an area like a horizontal line extending from the first coefficient position. This case is referred to as "case 1".

Figure 18B:
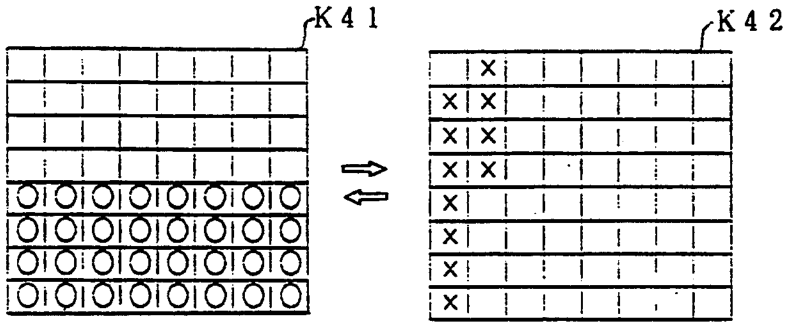

A second pattern, as shown in FIG. 18B, is in a case of a block picture area K41 having a horizontal edge. In this case, the discrete cosine transform output area K42 has high energy discrete cosine transform coefficients concentrated in an area like a vertical line extending from the first coefficient position. This case is referred to as "case 2".

Figure 18C:
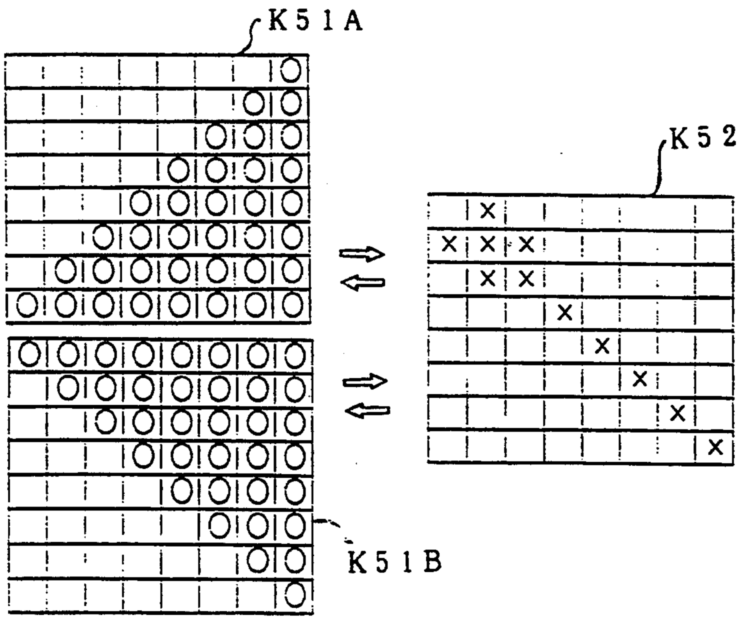

A third pattern, as shown in FIG. 18C, is in a block picture area 51A or 51B having an obliqued edge. In this case, the discrete cosine transform output area K52 has high energy discrete cosine transform coefficients concentrated in an area like an oblique line extending from the first coefficient position. This case is referred to as "case 3".

The coding system judging unit 3 obtains, for the cases in FIGS. 18A and 18C, the summation Fa of the absolute values of all the discrete cosine transform coefficients except the DC component and also the summations F1 to F3 of the absolute values of the discrete cosine transform coefficients indicated by the cross marks in the discrete cosine transform output areas K32, K42 and K52 of the cases 1 to 3 for each block, and using the largest one Fmax of the absolute value summations F1 to F3 it judges that the intra-block non-transform coding unit 6 should be used for coding a block, in which the ratio of the largest absolute value summation Fmax to the absolute value summation Fa exceeds an appropriate threshold value THB selected from the considerations of the compression factor and pattern deterioration.

In a third method of coding system judging, the judging is effected in both of the discrete cosine transform output area and picture block space area. In this case, the coding system judging unit 3 determines the coding system to be used by executing a coding system selection routine RT1 shown in FIG. 19.

Figure 19:
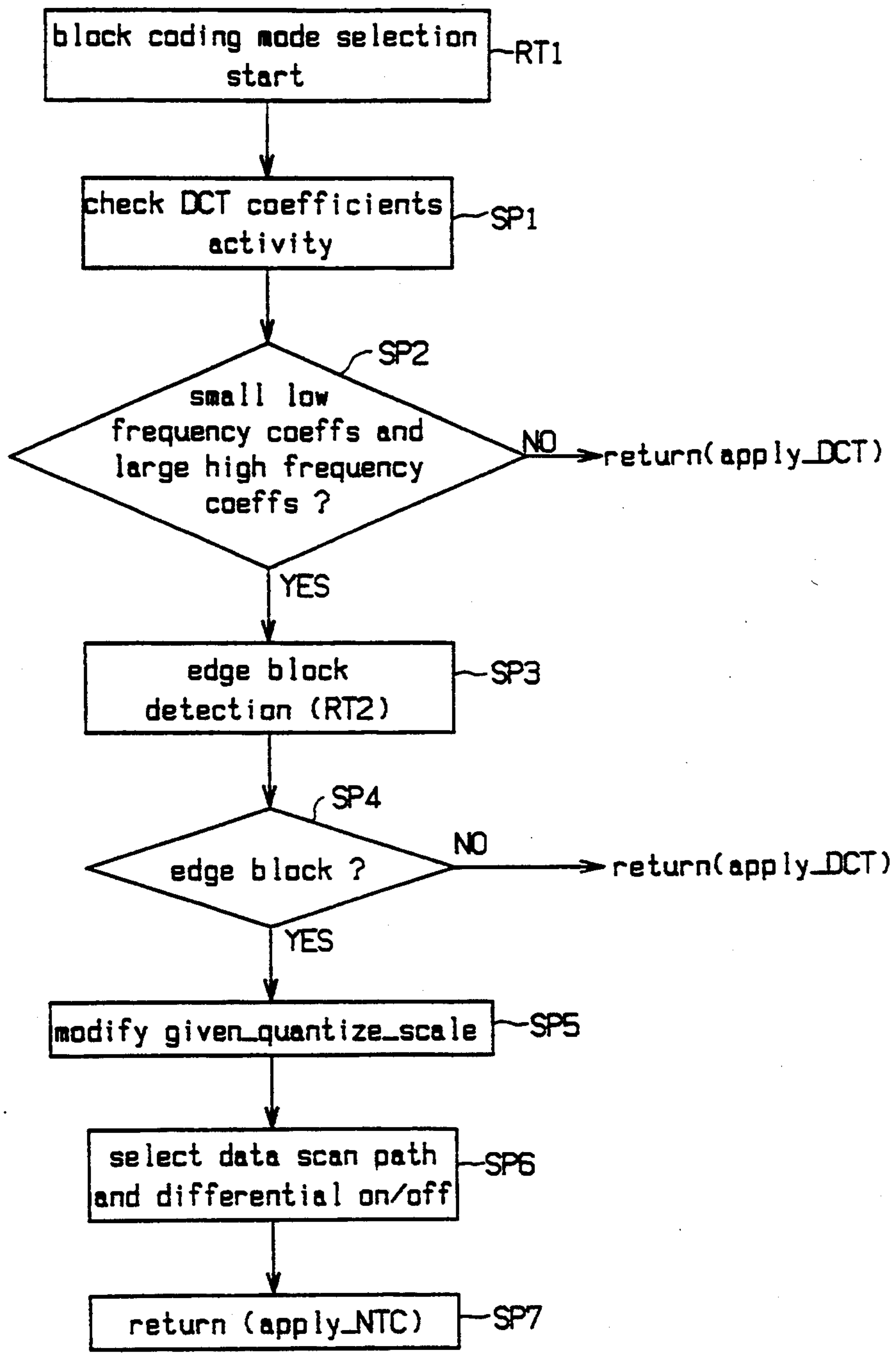
FIG. 19 is a flow chart showing the procedure of coding system selection.

In the coding system selection routine RT1 shown in FIG. 19, in a step SP1 the coding system judging unit 3 checks the output as a result of the discrete cosine transform of the input picture block according to the discrete cosine transform signal S3 of the discrete cosine transform circuit 11, and in a step SP2 it checks whether the discrete cosine transform output area block has transform coefficients representing a sharply changing brightness pattern like an edge (i.e., both of small low and large high frequency coefficients).

This check is done for utilizing, for the coding system switching, a character of the sharply changing brightness pattern that broadly distributed frequency components from low to high frequencies are generated in the discrete cosine transform output area. At this time, the coding system judging unit 3 executes a algorithm shown in FIGS. 21 and 22.

Denoting the summation of the second powers of 17 low frequency area coefficients exclusive of the left top corner DC component, as shown in FIG. 21A, by low ac_power and the summation of the second powers of all the discrete cosine transform coefficients except the DC component by all_ac_power, if low_ac_power is no greater than a threshold LITTLE_AC_THRESHOLD and also if the ratio between low_ac_power and all_ac_power is no less than a threshold value AC_CONCENTRATE_THRESHOLD, it is judged that the discrete cosine transform system should be used for coding this input picture block. At this time, a NO result is yielded in the step SP2 in FIG. 19, and the coding system judging unit 1 for the execution of the coding.

Otherwise, the pertinent block is determined to be a candidate block for the intra-block non-transform coding (NTC). At this time, the coding system judging unit 3 obtains a YES result in the step SP2 in FIG. 19, and thus it executes the next step SP3.

The threshold values LITTLE_AC_THRESHOLD and AC_CONCENTRATE_THRESHOLD and the low frequency region may be set adequately from the considerations of the compression factor and pattern deterioration.

Figure 20:
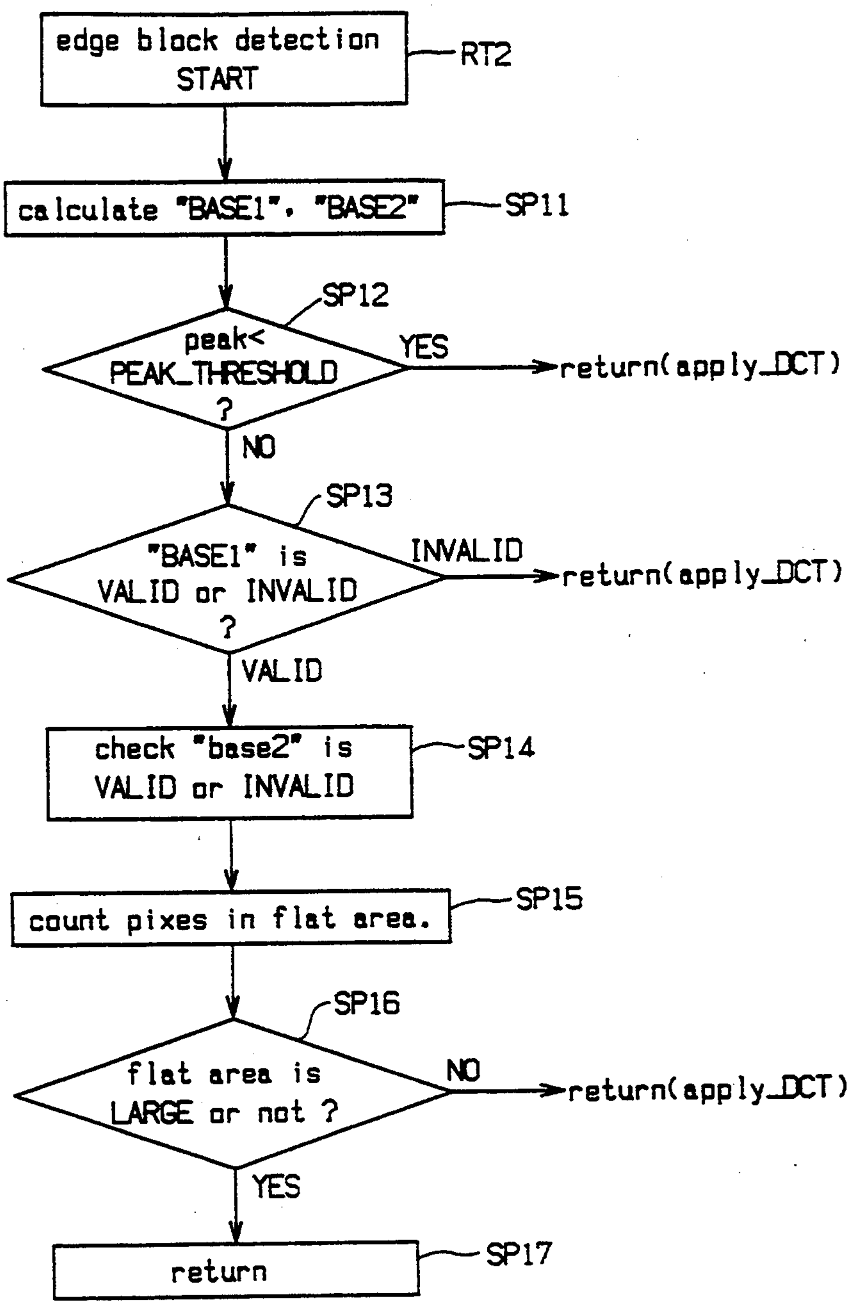
FIG. 20 is a flow chart showing a contour block detection sub-routine.

The coding system judging unit 3 executes in the step SP3 an edge block detection sub-routine RT2 shown in FIG. 20 to detect a block including an edge, and then in the next step SP4 it judges whether the detected block includes edge picture.

In the edge block detection sub-routine RT2 shown in FIG. 20, in a step SP11 the coding system judging unit 3 calculates the typical values BASE1 and BASE2 of the block.

The typical values BASE1 and BASE2 of the block are mean values of flat area in the pertinent block.

Figure 23A:
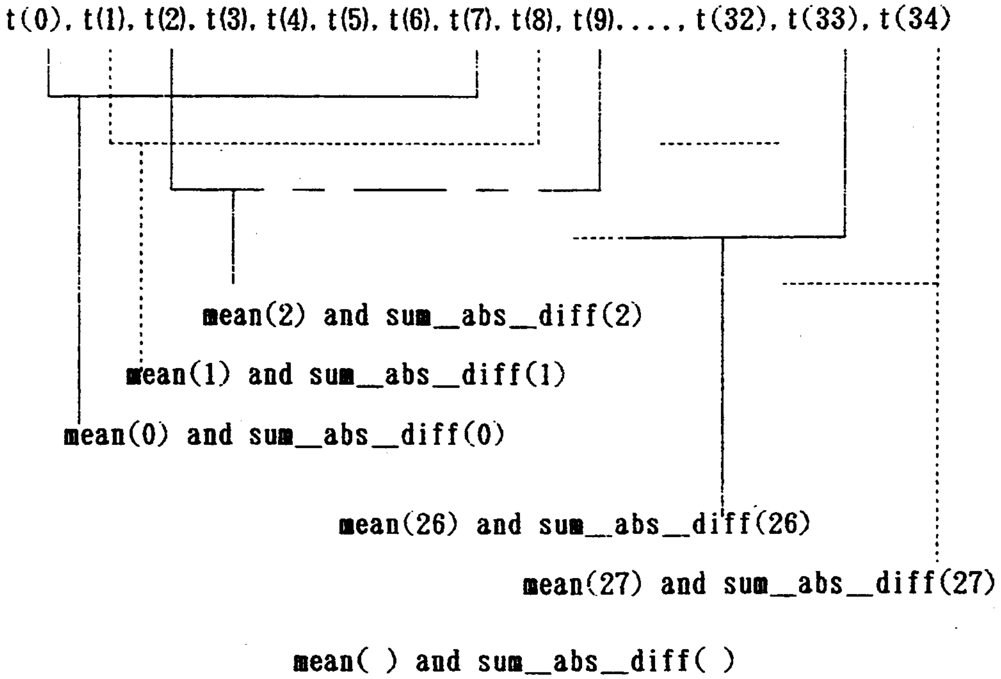
FIG. 23 is a view showing memory data after processing.

It is assumed that pixel values of a block consisting of 8 by 8 pixels are stored in array memory pixel positions [X0, . . . X63] in the order of numbers shown in FIG. 22A. The typical values of the block are estimated from 28 pixels shown in FIG. 22B. These pixel values are taken out from the positions [X0, . . . , X63] in the order shown by arrow in FIG. 22C (numbers indicating the order) and stored in an array memories t(0), . . . t(34) as shown in FIG. 23A.

The typical values of the block are calculated with a DCT/NTC judging algorithm shown in FIGS. 24A to 28. FIGS. 24 to 28 shown the accurate definition of the algorithm in C language.

First, a differentiating process is executed between adjacent samples on the array memories t(0), . . . , t(34) to obtain differential value data of the array memories t(0), . . . t(34) and flat area estimation is effected according to this data. The flattest area is defined to be one, in which the summation of the absolute values of 8 continuous differential values of the array memories t(0), . . . , t(34) is smallest. A typical value of the block is defined to be the mean value of the values in 8 array memories t(0), . . . , t(34) in the flattest area. This value is referred to as BASE1, and the summation of the absolute values of the differential values in array memories t(0), . . . , t(34) in this area is referred to as sum_abs_diff1.

In steps SP12 and SP13, the coding system judging unit 3 judges whether the pertinent block has at least one of the following states. If the block has at least one such state, it is discrete cosine transform coded.

(a) peak<PEAK_THRESHOLD

Figure 29A:
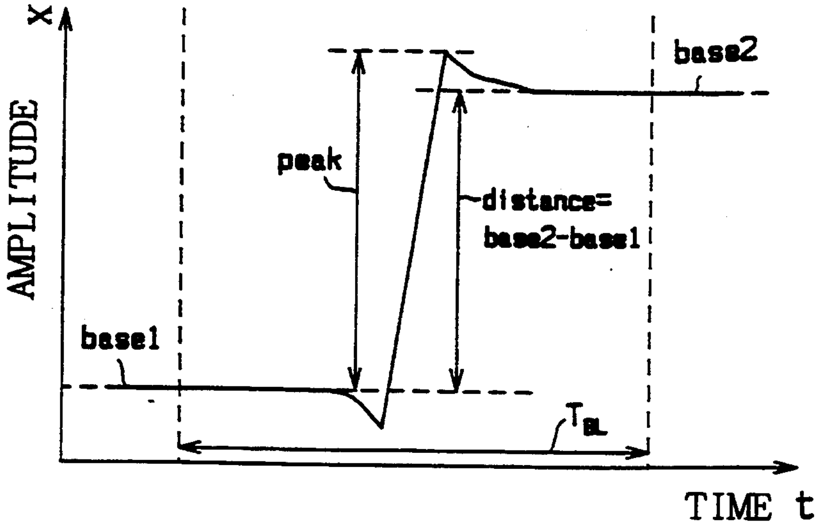
FIG. 29 is a signal waveform diagram showing an example of block picture signal including contour.
Figure 29B:
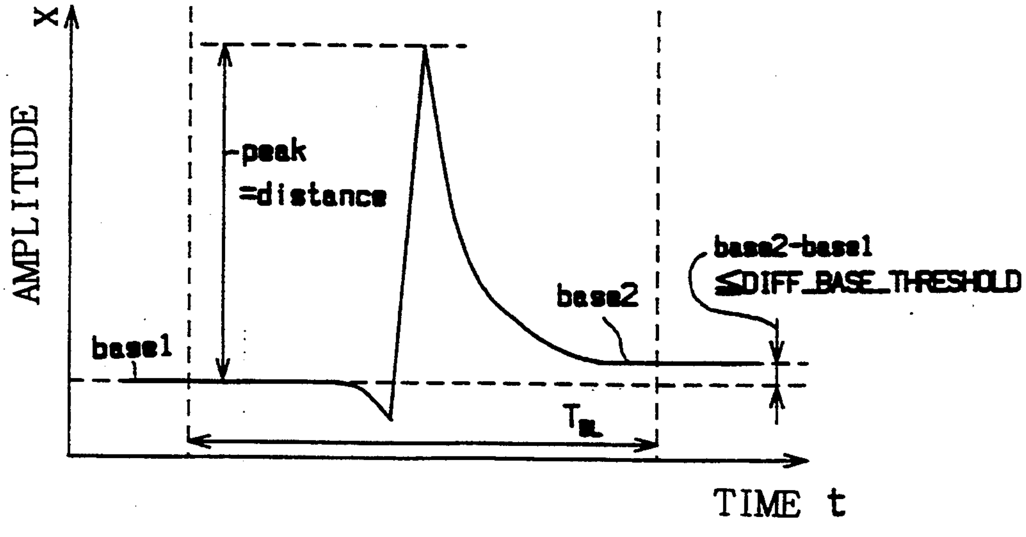

Peak is the value as shown in FIG. 29, and its accurate definition is shown in FIG. 26.

The PEAK_THRESHOLD is a threshold value given by the coder.

(b) BASE1 being ineffective

More specifically, sum_abs_diff1>FLAT_SAD_THRESHOLD is a threshold value given by the coder.

Figure 23B:
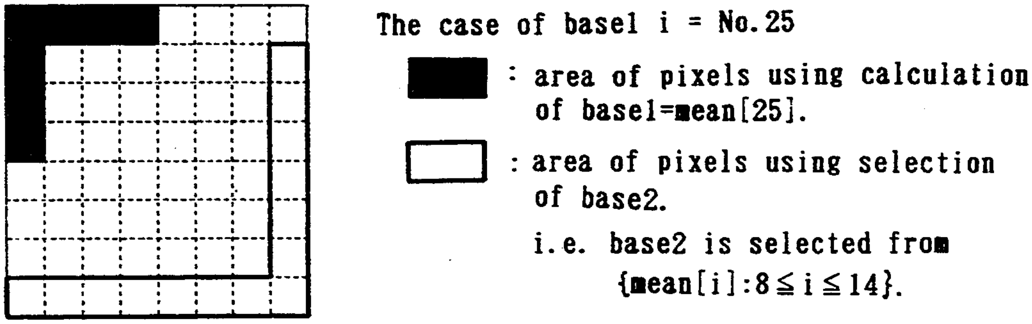

Subsequently, the coding system judging unit 3 executes a step SP14 in FIG. 20 to search the other typical value BASE2 of the block in a method shown in FIG. 25. The typical value BASE2 is searched in an area on the opposite side of the area, in which the typical value BASE1 is detected (see in FIG. 23B). The typical value BASE2 is calculated in the same manner as for the typical value BASE1. The typical value BASE2 need not be present. If the block has at least one of the following states, the typical value BASE2 is invalid and not present.

(c) sum_abs_diff2>FLAT_SAD_THRESHOLD (d) |BASE2_BASE1|<DIFF_BASE_THRESHOLD

The symbol "| |" here indicates the absolute value calculation.

DIFF_BASE_THRESHOLD is s threshold value given by the coder.

In subsequent steps SP15 and SP16 in FIG. 20, the coding system judging unit 3 checks the size of the flat area. In this routine, unit 3 checks whether the flat area in the pertinent block is large or not. FIGS. 27 and 28 show the accurate definition of the algorithm in C language.

First, the absolute value diff_base of difference signal between each pixel value in the block and BASE1 is calculated.

Then, the number of pixels, in which diff_base1 is no greater than DIFF_BASE_THRESHOLD, is calculated to obtain count_base1_pixel. If the typical value BASE2 is present, the same calculation is done with respect to the typical value BASE2 to obtain count_base2_pixel. If the sum of count_base1_pixel and count_base2_pixel is not greater than threshold value COUNT_FLAT_PIXEL_THRESHOLD, a YES result yields in a step SP16. In this case, the coding system judging unit 3 thus selects the discrete cosine transform system for coding this block.

If a NO result yields in the step SP16, on the other hand, in a step SP17 the coding system judging unit 3 ends the pertinent edge block detection subroutine RT2 and returns to the coding system selection routine RT1 in FIG. 19.

At this time, the coding system judging unit 3 executes the steps SP4 through SP7 to select the intra-block non-transform coding (NTC) system for coding.

When the intra-block non-transform coding (NTC) system is thus selected for coding, if count_base1_pixel and count_base2_pixel, the typical values BASE1 and BASE2 are interchanged.

Meanwhile, if the block (i.e., macro-block) to be coded is an intra-frame signal coded macro-block, the typical value BASE1 is transmitted as intra-block forecast value (corresponding to the DC value in the discrete cosine transform (DCT) coding.

If the macro-block to be coded is an inter-frame signal coded (or non-intra-frame coded) macro-block, the typical value BASE1 is fixed to zero and not transmitted. Alternatively, it is possible to transmit the typical value BASE1 even if the macro-block to be coded is a non-intra-frame coded macro-block. Thus, if the absolute value of the typical value BASE1 is greater than the threshold value DIFF_BASE_THRESHOLD, the discrete cosine transform (DCT) coding is selected for coding the block.

Threshold values BASE_DISTANCE_ERR, DIFF_BASE_THRESHOLD, FLAT_SAD_THRESHOLD, PEAK_THRESHOLD, BASE_DISTANCE_THRESHOLD and COUNT_FLAT_PIXEL_THRESHOLD are adequately set in dependence on the compression factor and pattern deterioration.

In the calculation of the typical values of block, the typical value BASE1 obtained in the series of edge block detection processes executed in the step SP3, for instance, is adapted as typical value BASE of block. In addition, if the typical value BASE2 is present, it is used as typical value BASE' of block. If the typical value BASE2 is not present, as the typical value BASE' of block is used an intra-block sample value, which corresponds to the greatest absolute value of the difference between the typical value and intra-block sample value.

Instead of such method of calculation, it is possible to use the mean or smallest intra-block sample value as the typical value.

(5) Variable Length Coding

The variable length coding (VLC) unit 6 variable length codes the transmission control signal S7, which is constituted by discrete cosine transform (DCT) coding/intra-block non-transform coding (NTC) switching information, the typical value BASE of block used for intra-block non-transform coding (NTC) and quantizing width Q (or the typical value of block, difference between the typical value BASE and the other typical value BASE' of block and quantizing value Q), the order of intra-block sample scanning and the switching information as to whether the differentiating process is to be executed, along with motion picture data to be transmitted in the following way.

In the block-by-block discrete cosine transform (DCT) coding, a macro-block is formed with a plurality of coded blocks adjacent to one another as a group, and a single coding method is used for the transmission of the macro-block.

Particularly, in this embodiment for the switching of the method of intra-macro-block motion picture data coding the switching information and additional information for the intra-block non-transform coding (NTC) are added, as well be described below in detail.

The following information is used for the macroblock coding.

First coding information is macro-block type (macroblock_type). This information concerns whether contents of VLC coded representing the macro-block coding method include macro-block quantizing scale, information as to whether the macro-block is of the intra- or inter-frame coding mode, forecast mode in the inter-frame coding mode, macro-block motion forecast vector and intra-block non-transform coding (NTC) of blocks constituting a macro-block.

Second coding information is macro-block quantizing scale (Quantize_scale). With blocks constituting macro-blocks constituted by VLC codes representing macro-block quantizing scale values, this quantizing scale is basically used to quantize discrete cosine transform (DCT) coefficients or picture signal. For blocks to be intra-block non-transform coded, it is possible to use a block quantizing scale to be described later.

Third coding information is macro-block motion forecast vector (Motion_vector). This information is a VLC code representing a motion forecast vector value in case when the macro-block is of the inter-frame coding mode.

Fourth coding information is a coded block pattern (Coded_block_pattern). This information is a VLC code representing the position of a block among blocks constituting a macro-block, in which has discrete cosine transform (DCT) coefficients or picture coefficients to be transmitted. It is not present when the macro-block is of the intra-frame coding mode.

Fifth coding information is DCT/NTC switching information. When the coding of block includes the intra-block non-transform coding (NTC), the information consists of a VLC code representing the position of a block, for which NTC is selected. It is not present when the discrete cosine transform (DCT) coding is selected for all the blocks. Further, this code is unnecessary in case that it is selected the intra-block predictive coding in a system, in which coding method is adaptively switched per macro block unit to discrete cosine transform or intra-block forecast coding, if it determined intra-block forecast predictive encode all of blocks included in a macro block.

Figure 30:
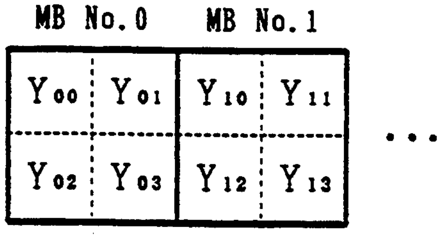
FIG. 30 is a view showing an example of the transmission of DCT/NTC switching information.

FIG. 30 shows a case, in which each macro-block consists of 4 blocks. In this case, a macro-block of the intra-frame coding mode is represented by a 4-bit code, each bit representing coding system switching information with respect to each block constituting the macro-block.

Likewise, an intra-frame coding mode macro-block may be represented with a 4-bit code. Alternatively, it may be represented with a code having a length equal to the number of blocks, in which coefficient judged from the "coded block patter" noted above is present (FIG. 30).

When each bit is "0", it represents the discrete cosine transform (DCT). When it is "1", it represents the intra-block non-transform coding (NTC).

This information may be replaced with a Huffman variable length code or the like.

Block coding information is as follows.

First block coding information is additional information for the intra-block non-transform coding. This information is present in case of a block, in which the following three codes (a) to (c) are coded by the intra-block non-transform coding (NTC).

(a) Data scan path type

This code represents the type of the selected data scan path. For example, when the four different paths DSP1 to DSP4 as noted above in connection with FIG. 14 are prepared, the selected path can be represented by using a 2-bit code.

(b) Flag as to whether differentiation is to be executed

This flag concerns whether a differentiating process is to be executed after the scan conversion. It is a one-bit on-off data. Provided that this code is unnecessary, when determining previously whether a differentiating process is to be executed or not according to coding mode of block.

(c) Block Quantizing scale

This code is a VLC code concerning the block quantizing scale value. It is unnecessary in case the block quantizing scale is fixed to the "macro-block quantizing scale" noted above or to a value obtained by substituting the "macro-block quantizing scale" into a certain equation.

For example, it may be unnecessary with a motion picture coding system, in which the discrete cosine transform coding and intra-block non-transform coding are adaptively switched for each block to be coded, while transmitting block discrete transform coding/intra-block non-transform coding switching information, and also in which for the intra-block non-transform coding two typical values BASE and BASE' of block are obtained to transmit BASE, difference between BASE and BASE' and quantizing width for adaptive quantizing. Otherwise, the value of the block quantizing scale may be represented by a code of a fixed length, for instance about 7 bits. Alternatively, the difference of the scale from the "macro-block quantizing scale" noted above may be expressed by variable length coding it.

Figure 31:
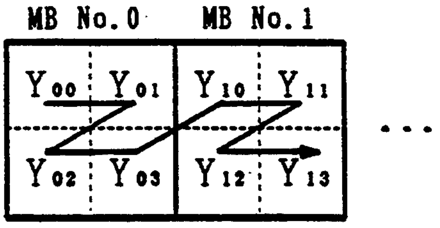
FIG. 31 is a view showing an example of the transmission of intra-block typical value.

Second block coding information is an intra-block typical value and consists of a VLC code concerning therewith. This code is unnecessary in case when the intra-block typical value is fixed to "0". Otherwise, the intra-block typical value (which is a DC coefficient in case of the discrete cosine transform coding and BASE in case of the intra-block non-transform coding) may be represented by a fixed length code of 8 bits, for instance. Alternatively, it is possible to execute a differentiating process on block typical values in an order as shown by arrow in FIG. 31 and variable length code the obtained differentiated values.

Third block coding information is the difference between two intra-block typical values. In a motion picture coding system, in which the discrete cosine transform coding and intra-block non-transform coding are adaptively switched for each block to be coded, while transmitting block discrete cosine transform intra-block non-transform coding switching information, and also in which for the intra-block non-transform coding the two typical values BASE and BASE' of block are obtained ed to transmit BASE, difference value between BASE and BASE' and quantizing width for adaptive quantizing, for the intra-block non-transform coding the difference between the two typical values BASE and BASE' of block is transmitted with a fixed length of 8 bits, for instance.

Fourth block coding information is coefficient data (picture data). This data is obtained by converting scan-converted one-dimensional data into VLC codes. It is transmitted by two-dimensional Huffman coding, for instance. In this case, for a coefficient having a value other than "0" this value and relative position of the coefficient are set to form a variable length code for transmission.

The discrete cosine transform and intra-block non-transform coded signals have different statistical characters. Accordingly, reference tables for two-dimensional Huffman coding may be prepared for both of the signals and used according to the discrete cosine transform coding/intra-block non-transform coding switching signal. By so doing, the coding efficiency can be further increased.

(6) Decoding System

In the decoding system DV2, as shown in FIG. 2, the coded bit stream input is temporarily stored in the buffer 31. Then, the inverse variable length coding (inverse VLC) unit 32 decodes the DCT/NTC switching signal from the stored coded bit stream and selects either DCT or NTC for each block according to the decoded information.

The delay circuit 33 is provided for timing adjustment with respect to the NTC processing. The first inverse quantizer 34 and inverse discrete cosine transform (DCT) circuit 35 have complementary structures to those of the corresponding elements in the discrete cosine coding unit 1 noted above.

Figure 32:
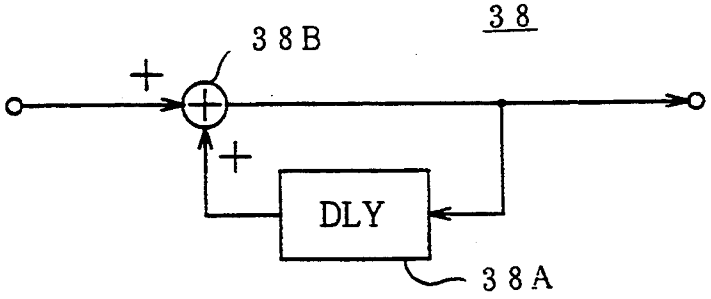
FIG. 32 is a connection diagram showing an inverse differential coding unit.

Likewise, the inverse differentiator 38 (which includes a one process period delay circuit 38A and an adder 38B as shown in FIG. 32), inverse scan converter 37, second inverse quantizer 38 and inverse intra-block forecaster 39 have complementary structure to those of the corresponding elements in the intra-block non-transform coding unit 2.

The forecaster 5 reproduces original picture from the output of the inverse DCT circuit 35 or inverse intra-block forecaster 39 that has been obtained by processing for each block.

While there has been described in connection with the preferred embodiments of the invention, it will be obvious to those skilled in the art that various changes and modifications may be made therein without departing from the invention, and it is aimed, therefore, to cover in the appended claims all such changes and modifications as fall within the true spirit and scope of the invention.

What is claimed is:

1. A method of coding video signals representing at least a portion of a video image, comprising the steps of:

discrete cosine transform (DCT) coding a respective block of said video signals to generate a plurality of DCT coefficients;

intra-block non-transform coding said block to generate a plurality of intra-block non-transform coding coefficients comprising a representative value of said block and comprising difference values each representing a difference between a respective pixel of said block and said representative value;

determining a respective one of said DCT coding and said intra-block non-transform coding that is most representative of said respective block;

selecting either said plurality of DCT coefficients or said plurality of intra-block non-transform coding coefficients as a function of the respective one of said DCT coding and said intra-block non-transform coding; and transmitting the selected plurality of DCT coefficients or intra-block non-transform coding coefficients with a signal indicating the respective one of said DCT coding and said intra-block non-transform coding.

2. A method according to claim 1, wherein said portion of said video image is a field of said video image.

3. A method according to claim 1, wherein said portion of said video image is a frame of said video image.

4. A method according to claim 1, wherein said step of discrete cosine transform (DCT) coding said block includes quantizing said plurality of DCT coefficients and sequencing a plurality of quantized DCT coefficients in a predetermined order to generate a sequence of quantized DCT coefficients, and said step of selecting either said plurality of DCT coefficients or said plurality of intra-block non-transform coding coefficients selects either said sequence of quantized DCT coefficients or said plurality of intra-block non-transform coding coefficients.

5. A method according to claim 1, further comprising variable length encoding said selected plurality of DCT coefficients or intra-block non-transform coding coefficients.

6. A method according to claim 1, wherein said step of intra-block non-transform coding said block includes quantizing said difference values as a function of a quantizing width, and scan converting quantized difference values as a function of the magnitudes of said quantized difference values to generate a sequence of scan converted, quantized difference values; and said step of transmitting the selected plurality of DCT coefficients or intra-block non-transform coding coefficients includes transmitting said quantizing width and a scanning order of said sequence of scan converted, quantized difference values.

7. A method according to claim 6, wherein said step of intra-block non-transform coding said block includes determining whether differentiating said sequence of scan converted, quantized difference values reduces a count of said values having non-zero magnitudes, and differentiating said sequence of scan converted, quantized difference values when said count is reduced; and said step of transmitting the selected plurality of DCT coefficients or intra-block non-transform coding coefficients includes transmitting a differential coding signal indicating whether said plurality of intra-block non-transform coding coefficients is differentiated.

8. A method according to claim 1, wherein said step of determining a respective one of said DCT coding and said intra-block non-transform coding determines said respective one as a function of changes in brightness within said block.

9. A method according to claim 8, wherein said respective one of said DCT coding and said intra-block non-transform coding is determined by determining whether a difference between a maximum brightness value within said block and a minimum brightness value within said block exceeds a predetermined threshold value.

10. A method according to claim 8, wherein said respective one of said DCT coding and said intra-block non-transform coding is determined by determining whether a sum of magnitudes of selected ones of said plurality of DCT coefficients exceeds a predetermined threshold value.

11. A method according to claim 8, wherein said respective one of said DCT coding and said intra-block non-transform coding is determined as a function of relative magnitudes of respective ones of said plurality of DCT coefficients representing lower frequencies and respective ones of said plurality of DCT coefficients representing higher frequencies.

12. A method of decoding video signals representing at least a portion of a video image and which includes a coding method signal indicating whether each respective block of said video signals is discrete cosine transform (DCT) coded or intra-block non-transform coded, said method comprising the steps of:

discrete cosine transform (DCT) decoding said video signals to derive a respective block of inverse DCT data;

intra-block non-transform decoding said video signals to derive a respective block of inverse intra-block non-transform data; and selecting either said inverse DCT data or said inverse intra-block non-transform data as a function of said coding method signal.

13. Apparatus for coding video signals representing at least a portion of a video image, comprising:

means for discrete cosine transform (DCT) coding a respective block of said video signals to generate a plurality of DCT coefficients;

means for intra-block non-transform coding said block to generate a plurality of intra-block non-transform coding coefficients comprising a representative value of said block and comprising difference values each representing a difference between a respective pixel of said block and said representative value;

means for determining a respective one of said DCT coding and said intra-block non-transform coding that is most representative of said respective block;

means for selecting either said plurality of DCT coefficients or said plurality of intra-block non-transform coding coefficients as a function of the respective one of said DCT coding and said intra-block non-transform coding; and means for transmitting the selected plurality of DCT coefficients or intra-block non-transform coding coefficients with a signal indicating the respective one of said DCT coding and said intra-block non-transform coding.

14. An apparatus according to claim 13, wherein said portion of said video image, is a field of said video image.

15. An apparatus according to claim 13, wherein said portion of said video image is a frame of said video image.

16. An apparatus according to claim 13, wherein said means for discrete cosine transform (DCT) coding said block includes means for quantizing said plurality of DCT coefficients and means for sequencing a plurality of quantized DCT coefficients in a predetermined order to generate a sequence of quantized DCT coefficients, and said means for selecting either said plurality of DCT coefficients or said plurality of intra-block non-transform coding coefficients selects either said sequence of quantized DCT coefficients or said plurality of intra-block non-transform coding coefficients.

17. An apparatus according to claim 13, further comprising means for variable length encoding said selected plurality of DCT coefficients or intra-block non-transform coding coefficients.

18. An apparatus according to claim 13, wherein said means for intra-block non-transform coding said block includes means for quantizing said difference values as a function of a quantizing width and means for scan converting quantized difference values as a function of the magnitudes of said quantized difference values to generate a sequence of scan converted, quantized difference values; and said means for transmitting the selected plurality of DCT coefficients or intra-block non-transform coding coefficients operates to transmit said quantizing width and a scanning order of said sequence of scan converted, quantized difference values.

19. An apparatus according to claim 18, wherein said means for intra-block non-transform coding said block includes means for determining whether differentiating said sequence of scan converted, quantized difference values reduces a count of said values having non-zero magnitudes, and means for differentiating said sequence of scan converted, quantized difference values when said count is reduced; and said means for transmitting the selected plurality of DCT coefficients or intra-block non-transform coding coefficients operates to transmit a differential coding signal indicating whether said plurality of intra-block non-transform coding coefficients is differentiated.

20. An apparatus according to claim 13, wherein said means for determining a respective one of said DCT coding and said intra-block non-transform coding operates to determine said respective one as a function of changes in brightness within said block.

21. An apparatus according to claim 20, wherein said respective one of said DCT coding and said intra-block non-transform coding is determined by determining whether a difference between a maximum brightness value within said block and a minimum brightness value within said block exceeds a predetermined threshold value.

22. An apparatus according to claim 20, wherein said respective one of said DCT coding and said intra-block non-transform coding is determined by determining whether a sum of magnitudes of selected ones of said plurality of DCT coefficients exceeds a predetermined threshold value.

23. An apparatus according to claim 20, wherein said respective one of said DCT coding and said intra-block non-transform coding is determined as a function of relative magnitudes of respective ones of said plurality of DCT coefficients representing lower frequencies and respective ones of said plurality of DCT coefficients representing higher frequencies.

24. Apparatus for decoding video signals representing at least a portion of a video image and which includes a coding method signal indicating whether each respective block of said video signals is discrete cosine transform (DCT) coded or intra-block non-transform coded, said apparatus comprising:

means for discrete cosine transform (DCT) decoding said video signals to derive a respective block of inverse DCT data;

means for intra-block non-transform decoding said video signals to derive a respective block of inverse intra-block non-transform data; and means for selecting either said inverse DCT data or said inverse intra-block non-transform data as a function of said coding method signal.

* * * * *